(12) United States Patent
Gisquet et al.

(10) Patent No.: US 10,425,645 B2
(45) Date of Patent: Sep. 24, 2019

(54) ENCODER OPTIMIZATIONS FOR PALETTE ENCODING OF CONTENT WITH SUBSAMPLED COLOUR COMPONENT

(71) Applicant: CANON KABUSHIKI KAISHA, Tokyo (JP)

(72) Inventors: Christophe Gisquet, Acigne (FR); Guillaume Laroche, Saint Aubin d'aubigne (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 15/280,690

(22) Filed: Sep. 29, 2016

(65) Prior Publication Data

US 2017/0099489 A1    Apr. 6, 2017

(30) Foreign Application Priority Data

Oct. 2, 2015 (GB) .................................... 1517479

(51) Int. Cl.
*H04N 11/02* (2006.01)
*H04N 19/132* (2014.01)
(Continued)

(52) U.S. Cl.
CPC ......... *H04N 19/132* (2014.11); *H04N 19/126* (2014.11); *H04N 19/176* (2014.11);
(Continued)

(58) Field of Classification Search
CPC .................................................. H04N 19/132
(Continued)

(56) References Cited

U.S. PATENT DOCUMENTS 6,912,069 B1 * 6/2005 Matsunoshita .... H04N 1/32144
358/2.1
7,817,161 B2 * 10/2010 Lefebvre ............... G06T 11/001
345/582

(Continued)

OTHER PUBLICATIONS

Joshi, et al., High Efficiency Video Coding (HEVC) Screen Content Coding, Draft 2, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, Document JCTVC-S1005 on p. 1.

(Continued)

*Primary Examiner* — Leron Beck
(74) *Attorney, Agent, or Firm* — Canon U.S.A., Inc. IP Division

(57) ABSTRACT

The invention relates to the encoding of pixel blocks. To apply some encoding tools, an input 4:2:0 block is upsampled into a 4:4:4 block. Each color component of the 4:4:4 block has thus the same importance when evaluating a distortion measure. To vary the influence of the color components depending on their impact on the decoding, the invention provides assigning weights to the color components of pixels of the 4:4:4 block depending on whether the corresponding color components exist in the 4:2:0 block, due to the subsampling. In such a case, any measure is evaluated using the weighted color components. This approach may apply to the palette coding mode, for instance when updating the color component values of a palette entry upon building, or selecting the closest palette entry to a pixel currently considered, or also determining whether a palette entry predictor may be used instead of a palette entry.

15 Claims, 14 Drawing Sheets

(51) Int. Cl.
*H04N 19/126* (2014.01)
*H04N 19/176* (2014.01)
*H04N 19/182* (2014.01)
*H04N 19/186* (2014.01)
*H04N 19/85* (2014.01)

(52) U.S. Cl.
CPC ......... *H04N 19/182* (2014.11); *H04N 19/186* (2014.11); *H04N 19/85* (2014.11)

(58) Field of Classification Search
USPC ........................................ 375/240.01–240.29
See application file for complete search history.

(56) References Cited

U.S. PATENT DOCUMENTS

| | | | | |
|---|---|---|---|---|
| 8,599,214 B1* | 12/2013 | Dall | ........................ | H04N 1/64 345/589 |
| 2005/0105111 A1* | 5/2005 | Ott | ...................... | B41F 33/0045 358/1.9 |
| 2007/0036223 A1* | 2/2007 | Srinivasan | .............. | H03M 7/46 375/240.18 |
| 2015/0146976 A1* | 5/2015 | Ma | .......................... | H04N 1/646 382/166 |
| 2015/0281728 A1* | 10/2015 | Karczewicz | ........... | H04N 19/93 375/240.16 |
| 2016/0142721 A1* | 5/2016 | Shimada | ............... | H04N 19/186 382/166 |
| 2017/0374384 A1* | 12/2017 | Xiu | ....................... | H04N 19/176 |

OTHER PUBLICATIONS

Gisquet, et al., AhG10: palette predictor stuffing, Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014 on p. 29.

Gisquet, et al., AhG10: Palette Predictor Stuffing JCTVC-Q0063, Power Point Presentation, 7th Meeting: Valencia, ES, Mar. 27-Apr. 4, 2014.

* cited by examiner

| Pred mode = 0 | Level = 1 | Run = 0 | Pred mode = 0 | Level = 0 | Run = 5 | Pred mode = 1 | Run = 26 | Pred mode = 0 | Level = 3 | Run = 0 | Pred mode = 0 | Level = 0 | Run = 8 |
|---|---|---|---|---|---|---|---|---|---|---|---|---|---|

↙ 73

| Pred mode = 0 | Level = 0 | Run = 8 | Pred mode = 0 | Level = 1 | Run = 5 | Pred mode = 0 | Level = 0 | Run = 3 | Pred mode = 0 | Level = 2 | Run = 0 |
|---|---|---|---|---|---|---|---|---|---|---|---|

↙ 72

| 0 | 0 | 0 | 0 | 0 | 0 | 0 | 0 |
|---|---|---|---|---|---|---|---|
| 0 | 1 | 0 | 0 | 0 | 0 | 3 | 0 |
| 0 | 1 | 0 | 0 | 0 | 0 | 0 | 0 |
| 0 | 1 | 1 | 1 | 1 | 1 | 1 | 0 |
| 0 | 1 | 2 | 2 | 2 | 2 | 2 | 0 |
| 0 | 1 | 0 | 0 | 0 | 0 | 0 | 0 |
| 0 | 1 | 0 | 0 | 0 | 0 | 0 | 0 |
| 0 | 0 | 0 | 0 | 0 | 0 | 0 | 0 |

ENCODER OPTIMIZATIONS FOR PALETTE ENCODING OF CONTENT WITH SUBSAMPLED COLOUR COMPONENT

This application claims the benefit under 35 U.S.C. § 119(a)-(d) of United Kingdom Patent Application No. 1517479.0, filed on Oct. 2, 2015 and entitled "ENCODER OPTIMIZATIONS FOR PALETTE ENCODING OF CONTENT WITH SUBSAMPLED COLOUR COMPONENT". The above cited patent application is incorporated herein by reference in its entirety.

FIELD OF THE INVENTION

The present invention concerns a method and a device for processing at least one image, in particular for encoding a block of pixels in an image, usually into a bitstream. The invention finds a particular application with the so-called palette coding mode as introduced in HEVC Screen Content Coding (SCC) Extension of the High Efficiency Video Coding international standard (see document JCTVC-S1005).

BACKGROUND OF THE INVENTION

The invention applies more particularly to the situation where an input block has some input subsampled pixels, for instance Chroma-subsampled pixels (e.g. a 4:2:0 YUV block), but needs to be up-sampled into a pre-encode block of pre-encode pixels having each the same number of colour component values (i.e. no subsampling, e.g. a 4:4:4 YUV block), before it is processed.

An example of such situation is the so-called palette coding mode, to which it is now made reference for illustrative purposes.

As known, the palette coding mode uses a palette comprising a set of entries associating respective entry indexes with corresponding sets of pixel colour component values. The palette makes it possible to build a block of indexes representing the pre-encode block of pre-encode pixels, thereby encoding the input block of pixels.

A palette in this document is defined as a look up table having entries, or "elements", associating an index with a value of a pixel. Typically, the value of a pixel is constituted by the value of each colour component associated with the pixel, resulting in a colour palette. Well known colour spaces are RGB representing Red, Green and Blue components and YUV (or YCbCr) representing one Luma and two Chroma components.

When encoding an image in a video sequence, the image is first divided into coding entities (also known as "coding structures") of pixels of equal size referred to as Coding Tree Blocks (CTBs). The CTBs may be grouped into other coding structures having a higher hierarchical level, such as slices and/or tiles. In other words, the image is recursively divided into hierarchical coding structures or coding entities.

The size of a Coding Tree Block is typically 64 by 64 pixels. Each Coding Tree Block may then be broken down into a hierarchical tree of smaller blocks whose size may vary and which are the actual blocks of pixels to encode. These smaller blocks to encode are referred to as Coding Units (CUs).

The encoding of a particular Coding Unit involves competition between predictive coding modes, including the well-known INTRA coding mode, the well-known INTER coding mode, and the Palette coding mode.

With the Palette coding mode, it is possible to define a representative block for a given Coding Unit as a block of indexes (also known as "levels") from a palette: for each pixel location in the Coding Unit, the said representative block contains the index associated with a pixel value in the Palette which is the closest to the value of the pixel having the same location (i.e. colocated) in the coding unit. However, this palette-based algorithm of selecting the closest palette entry is only used at the encoder in HEVC SCC: there is no need to know said algorithm in order to parse or decode a bitstream. Typically, "closest" means with the lowest distance using a particular metric distance such as the sum of absolute, or the square of, differences of component values. In particular, in case of lossless coding, this means the palette entry should be selected as equal to the pixel by the encoder. In the following, "correspond to" or "match" is used to mean either "is equal" when in lossless coding, or "is the closest" otherwise.

In the recent version of HEVC SCC, no residual between the original pixel block and the corresponding palette-based representative pixel block is provided. To avoid high quality decreasing in the encoded image, an "escape-coded" feature has been introduced to encode the pixels, the values of which do not match a pixel value of an entry of the Palette. It means, in lossless coding, that no palette entry is equal to the pixel value. In such case, a specific index in the Palette is used to signal an "escape-coded" pixel; and the quantized value itself of the escape-coded pixel is directly encoded in the bitstream, the quantization depending on a quantizer step transmitted at the CU-level. In case of lossless coding, the quantizer step is 0, meaning no quantization. The quantization is what is defined in the HEVC standard as the transform-bypass quantization, and the quantized values are encoded using truncated binary codes.

As currently proposed, the palette coding mode may be used for non-4:4:4 content, i.e. for input blocks conforming to an input sampling scheme having subsampling of at least one of colour components forming the pixels. This is for instance the case in 4:2:2 or 4:2:0 YUV signals where the Chroma components are subsampled. However, for this type of non-4:4:4 contents, the decoder first decodes the data as 4:4:4, and then discards the unused Chroma components to match the input format. It means that the encoder performs the reverse approach, by up-sampling the input block of pixels (e.g. in 4:2:2 or 4:2:0 sampling scheme of corresponding 4:2:2 or 4:2:0 Chroma formats) into a pre-encode block of pre-encode pixels conforming to a pre-encode sampling scheme having no subsampling of the colour components forming the pixels, e.g. 4:4:4 sampling scheme.

The required up-sampling step introduces suboptimal computation when applying the palette coding mode to encode the pre-encode block of pixels.

SUMMARY OF THE INVENTION

The present invention has been devised to overcome all or part of the foregoing drawbacks. In particular, it seeks to improve the efficiency of encoding non-4:4:4 or the like contents when an up-sampling thereof into 4:4:4 sampling scheme is required.

An idea of the inventors is to modify the impact of the discarded Chroma components (which are regenerated during up-sampling) when encoding a non-4:4:4 block of pixels. Associated weights may thus be defined to be taken into account in the encoder decisions. Counter-intuitively, the inventors have noted that such regenerated discarded colour components should preferably still be taken into account.

To achieve this idea, embodiments of the invention provide a method of encoding a block of pixels in an image, the method comprising the following steps:

obtaining an input block of input pixels conforming to an input sampling scheme having subsampling of at least one of colour components forming the pixels;

up-sampling the input block into a pre-encode block of pre-encode pixels conforming to a pre-encode sampling scheme having no subsampling of the colour components;

encoding the pre-encode block of pre-encode pixels, wherein encoding the pre-encode block includes assigning weights to the values of the at least one subsampled colour component of pre-encode pixels depending on whether the corresponding values of the same subsampled colour component exist or not in the corresponding input pixels due to the subsampling, and includes evaluating a measure using the weighted values of the pre-encode pixels.

As widely known, the input sampling scheme having subsampling of at least one colour component (usually Chroma component) makes that one of the pixel colour components is missing because it has been discarded or deleted by a subsampling operation. This is for instance the case of the well-known YUV 4:2:2 or 4:2:0 sampling schemes.

Correspondingly, embodiments of the invention relate to a device for encoding a block of pixels in an image, the device comprising at least one microprocessor configured for carrying out, in a web runtime environment running in the device, the steps of:

obtaining an input block of input pixels conforming to an input sampling scheme having subsampling of at least one of colour components forming the pixels;

up-sampling the input block into a pre-encode block of pre-encode pixels conforming to a pre-encode sampling scheme having no subsampling of the colour components;

encoding the pre-encode block of pre-encode pixels, wherein encoding the pre-encode block includes assigning weights to the values of the at least one subsampled colour component of pre-encode pixels depending on whether the corresponding values of the same subsampled colour component exist or not in the corresponding input pixels due to the subsampling, and includes evaluating a measure using the weighted values of the pre-encode pixels.

The approach proposed by the present invention thus makes it possible to adjust the contribution of the colour components, such as Chroma components, that have little to no impact on the decoded output because they are discarded due to the subsampling. This is achieved by assigning appropriate weights to their values compared to the values of the colour components that are not discarded due to the subsampling.

Correspondence between an input pixel and a pre-encode pixel is straightforward since the up-sampling operation defined above only provides missing colour components to some input pixels. Therefore, a pre-encode pixel is no more than the same input pixel or the input pixel with one or more reconstructed missing colour components.

Application of this idea for the so-called palette coding mode may result in improved coding gain and/or distortion. The inventors have measured a 2% gain for intra coding and a 1% gain for low-delay.

In addition, this idea has little complexity impact.

Optional features of embodiments of the invention are defined in the appended claims. Some of these features are explained here below with reference to a method, and can be transposed into system features dedicated to any device according to embodiments of the invention.

In embodiments, encoding the pre-encode block applies a palette coding mode on the pre-encode block, the palette coding mode using a palette comprising a set of entries associating respective entry indexes with corresponding sets of pixel colour component values. The palette is thus used to build a block of indexes representing the pre-encode block of pre-encode pixels, thereby encoding the input block of pixels. The present invention is particularly well adapted to the palette coding mode that requires, according to the above-mentioned standard, a 4:4:4 pre-encode block of pixels.

In other embodiments, a first weight assigned to the value of a subsampled colour component of a first pre-encode pixel which corresponds to an input pixel having a value for the same subsampled colour component (i.e. a non-discarded colour component value) is higher than a second weight applied to the value of the same subsampled colour component of a second pre-encode pixel which corresponds to an input pixel having no value for the same subsampled colour component (i.e. a discarded colour component value). This actually makes it possible to vary the contribution of the colour component values when encoding the input block of pixels, depending on whether the colour component value is kept or not by the decoder based on the input (and thus output) subsampling format, i.e. on whether or not it has little or large impact on the decoded output.

In specific embodiments, the ratio between the first and second weights is a power of 2, for instance $2^5$ or $2^7$. The inventors have found that such ratio provides good results in terms of coding gain and/or distortion.

In some embodiment, the input sampling scheme subsamples at least one Chroma component of the pixels, for instance a YUV 4:2:0 scheme. More generally, the invention applies to any input sampling scheme that is not 4:4:4, in which case the pre-encode sampling scheme is 4:4:4.

In some embodiments, the same weight is assigned to two Chroma component values of a pre-encode pixel. This is because the subsampling schemes usually handle the two Chroma components in the same way.

In some embodiments, a weight equal to 1 is assigned to all Luma colour components of the pre-encode pixels. This is because the conventional subsampling schemes only subsample Chroma components. As a result, all the Luma components must be considered in the same way throughout the image.

In some embodiments, the weight assigned to a value of a subsampled colour component of a pre-encode pixel is a non-zero weight when the corresponding input pixel does not have a value for the same subsampled colour component, i.e. when the input pixel has been subsampled.

The inventors have observed that the colour component values discarded in an output block conforming to the input sampling scheme have however some influence on the encoding efficiency. As a consequence, this approach is contrary to the intuitive approach consisting to set their associated weights to zero to avoid impacting the encoding by "non-existing" colour components. This makes it possible to take into account the impact, no matter how small, of such discarded colour components.

The idea of the invention may be implemented during several operations of the palette coding mode. Of course, they may be combined.

In some embodiments, evaluating a measure includes calculating updated pixel colour component values for a palette entry when building the palette, based on the weighted values of pre-encode pixels associated with said palette entry. Association of pre-encode pixels with the palette entries may be performed through determining the closest (or identical) palette entry to the pixel values.

According to this provision, the colour component subsampling of the input block is taken into account when building the palette to encode said input block. Thanks to the proposed approach, the palette may be built to provide palette entries that are, on average, closer to the pixels having no discarded colour components. It results that the encoding efficiency is improved.

A weighted sum of the values of each colour component for all the pre-encode pixels associated with the palette entry may be obtained. In addition, a counter may count a weighted number of pixels considered for each weighted sum (for instance by summing the weights of all the pre-encode pixels for the colour component considered). In that case, the result of the division of each weighted sum with the corresponding weighted number of pixels may provide an appropriate updating value.

In such a case, the updated pixel colour component values are weighted average values of the values of the colour components of the pre-encode pixels associated with said palette entry. The weighted average values are, on average, closer to some of the pixels considered. By choosing appropriate weights for the pixels, such weighted average values can thus be made closer to the pixels having no discarded colour components as mentioned above.

In some embodiments, encoding the pre-encode block of pre-encode pixels includes determining a palette entry for each pre-encode pixel by evaluating a distortion measure between the pre-encode pixel and at least one palette entry using weighted values of colour components of the pre-encode pixel. This provision particularly applies when determining the closest palette entry to a current pixel to encode. The provision makes it possible to use a palette entry more frequently (which provides good compression results) because the impact of the error resulting from discarded colour components may be reduced by using appropriate weights.

In particular embodiments, the same weight is assigned to the values of two colour components of a pre-encode pixel which corresponds to an input pixel having values for the same two colour components, i.e. that are not discarded due to the input subsampling scheme. This particularly applies to the Luma component and the Chroma components (when kept) that are thus assigned the same weight for full input pixels (i.e. with all colour components) in 4:2:0 or 4:2:2 sampling schemes. As a consequence, a weight assigned to a discarded colour component is preferably made very low, for instance about $2^{-5}$. The above provision thus ensures the distortion measure to mirror the relevant component values of the pixels.

In some embodiments, encoding the pre-encode block of pre-encode pixels includes evaluating the opportunity to replace a palette entry by a palette entry predictor by evaluating a distortion measure between at least one pre-encode pixel associated with the palette entry and at least one palette entry predictor using weighted values of colour components of the pre-encode pixel.

Again, association of pre-encode pixels with the palette entries may be performed through determining the closest (or identical) palette entry to the pixel values. All the pre-encode pixels associated with the palette entry considered may be evaluated vis-à-vis each possible palette entry predictor, in order to find the best one and to possibly replace the palette entry considered, if appropriate.

The above provision thus applies to a post processing of the palette, in order to improve coding efficiency by predicting the palette entries.

In some embodiments, the colour components of the pixels are organised and spatially positioned according to a predetermined colour component pattern, and the weights applied to the colour component values depend on the predetermined colour component pattern used.

The pattern may be defined by the downsampling filter used to obtain the input (and output) blocks of pixels. Indeed, it is known for instance that the Chroma components may be slightly shifted from the Luma positions, for instance by 0.25 or 0.5 or 0.7. In this case, the influence of the kept Chroma components on the other pixels may vary. The above provision thus provides adjusting the weights depending on such shift, i.e. on the pattern used. As a consequence, the influence of the kept Chroma components is better estimated.

Other embodiments of the invention provide a method of decoding a bitstream into a block of pixels in an image, the method comprising the following steps:

decoding data of the bitstream to obtain a decode block of decode pixels conforming to a decode sampling scheme having no subsampling of colour components forming the pixels;

down-sampling the decode block into an output block of output pixels conforming to an output sampling scheme having subsampling of at least one of the colour components forming the pixels, wherein the output sampling scheme defines a predetermined colour component pattern organising and spatially positioning the values of the colour components in the output block of pixels;

wherein down-sampling the decode block includes:

assigning weights to the values of the at least one subsampled colour component of decode pixels depending on the predetermined colour component pattern; and calculating a value of the subsampled colour component for an output pixel using the weighted values of the decode pixels.

Correspondingly, embodiments of the invention relate to a device for decoding a bitstream into a block of pixels in an image, the device comprising at least one microprocessor configured for carrying out, in a web runtime environment running in the device, the steps of:

decoding data of the bitstream to obtain a decode block of decode pixels conforming to a decode sampling scheme having no subsampling of colour components forming the pixels;

down-sampling the decode block into an output block of output pixels conforming to an output sampling scheme having subsampling of at least one of the colour components forming the pixels, wherein the output sampling scheme defines a predetermined colour component pattern organising and spatially positioning the values of the colour components in the output block of pixels;

wherein down-sampling the decode block includes:

assigning weights to the values of the at least one subsampled colour component of decode pixels depending on the predetermined colour component pattern; and calculating a value of the subsampled colour component for an output pixel using the weighted values of the decode pixels.

Again, this decoding approach improves coding gain and/or distortion when for instance symmetrically adopted at the encoder, while keeping conformity to the standard. This is because the colour components of the output pixels may be more finely generated thanks to the weighted combination of colour component values of the decode pixels.

Another aspect of the invention relates to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the methods and node devices.

Another aspect of the invention relates to a method of encoding a block of pixels in an image, each pixel having a plurality of colour component values, substantially as herein described with reference to, and as shown in, FIG. 9 or 10 or 11 of the accompanying drawings.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 7 illustrates the same block of levels and the set of syntax elements used for the encoding of this block of levels;
FIG. 12 illustrates the principle of Chroma sample location, which impacts weights assigned to colour components according to embodiments of the invention.

DETAILED DESCRIPTION OF EMBODIMENTS OF THE INVENTION

Figure 1:
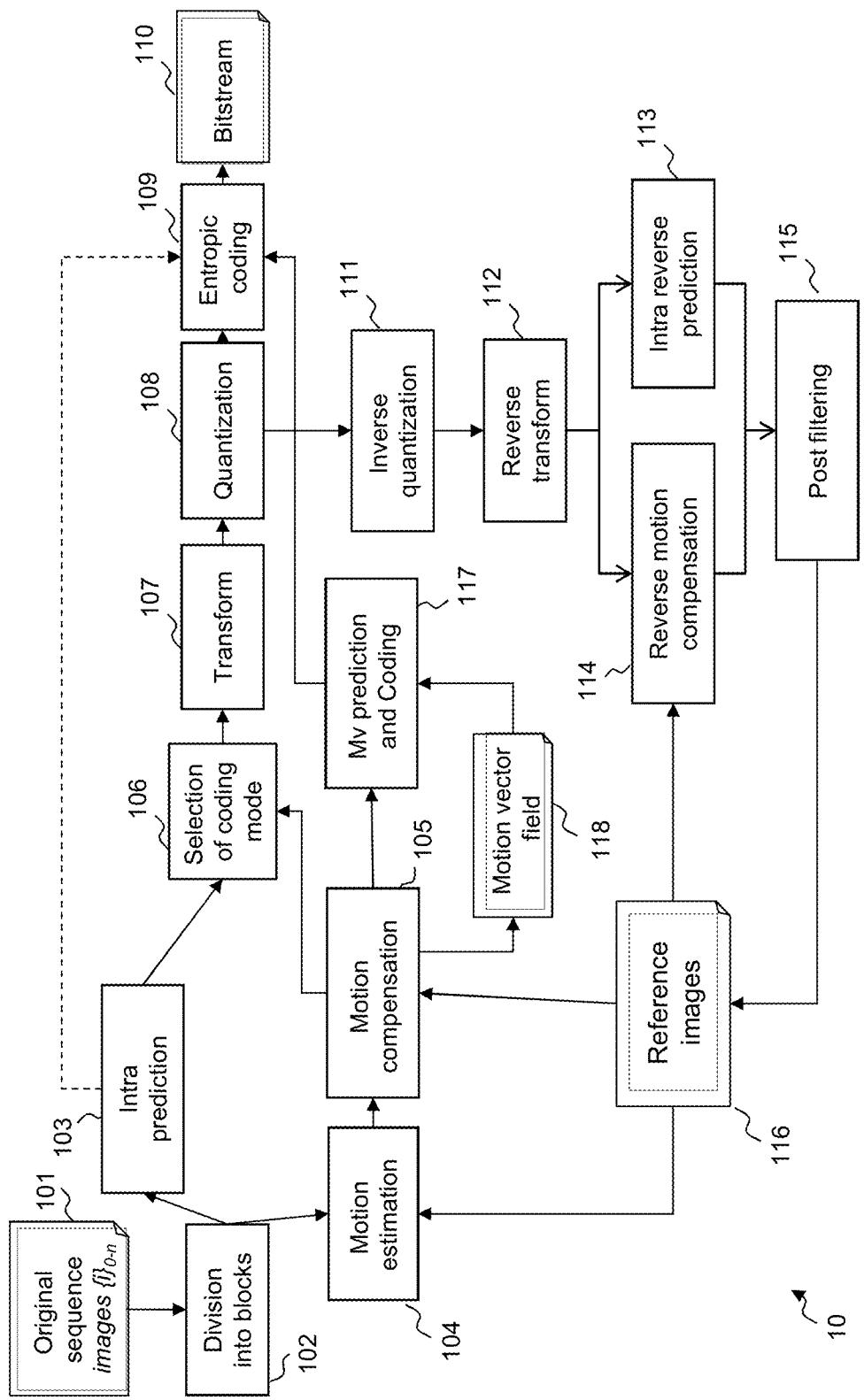
FIG. 1 illustrates the HEVC encoder architecture.

FIG. 1 illustrates the HEVC encoder architecture. In the video encoder, an original sequence 101 is divided into blocks of pixels 102. A coding mode is then assigned to each block. There are two families of coding modes typically used in HEVC: the modes based on spatial prediction or INTRA modes 103 and the modes based on temporal prediction or INTER modes based on motion estimation 104 and motion compensation 105. An extension of HEVC being currently designed, known as HEVC SCC, adds additional coding modes, in particular the Palette coding mode, which competes with INTRA and INTER coding modes to encode blocks of pixels. This Palette coding mode is described in more details below, in particular with reference to FIGS. 5 to 9. One skilled in the art may also obtain details about the Palette coding mode in document JCTVC-51005 (HEVC Screen Content Coding Draft Text 2), the latest as of writing.

To be noted that the invention is mainly described with respect to the Palette coding mode as specified in the HEVC SCC extension, but may apply to any other encoding process that requires up-sampling an input signal into a 4:4:4 or the like signal (i.e. with all pixels having all colour components).

An INTRA Coding Unit is generally predicted from the encoded pixels at its causal border by a process called INTRA prediction.

Temporal prediction of an INTER coding mode first consists in finding in a previous or future frame called the reference frame 116 the reference area of which is the closest to the Coding Unit, in a motion estimation step 104. This reference area constitutes the predictor block. Next this Coding Unit is predicted using the predictor block to compute the residue in a motion compensation step 105.

In both cases, spatial and temporal prediction, a residual is computed by subtracting the Coding Unit from the original predictor block.

In the INTRA prediction, a prediction direction is encoded. In the temporal prediction, at least one motion vector is encoded. However, in order to further reduce the bitrate cost related to motion vector encoding, a motion vector is not directly encoded. Indeed, assuming that motion is homogeneous, it is particularly advantageous to encode a motion vector as a difference between this motion vector, and a motion vector in its surroundings. In the H.264/AVC coding standard for instance, motion vectors are encoded with respect to a median vector computed between three blocks located above and on the left of the current block. Only a difference, also called residual motion vector, computed between the median vector and the current block motion vector is encoded in the bitstream. This is processed in module "Mv prediction and coding" 117. The value of each encoded vector is stored in the motion vector field 118. The neighbouring motion vectors, used for the prediction, are extracted from the motion vector field 118.

Next, the mode optimizing the rate distortion performance is selected in module 106. In order to further reduce the redundancies, a transform, typically a DCT, is applied to the residual block in module 107, and a quantization is applied to the coefficients in module 108. The quantized block of coefficients is then entropy coded in module 109 and the result is inserted into the bitstream 110.

The encoder then performs a decoding of the encoded frame for the future motion estimation in modules 111 to 116. This is a decoding loop at the encoder, similar to the decoding at the decoder. These steps allow the encoder and the decoder to have the same reference frames. To reconstruct the coded frame, the residual is inverse quantized in module 111 and inverse transformed in module 112 in order to provide the "reconstructed" residual in the pixel domain. According to the encoding mode (INTER or INTRA), this residual is added to the INTER predictor 114 or to the INTRA predictor 113.

Next, this first reconstruction is filtered in module 115 by one or several kinds of post filtering. These post filters are integrated into the decoding loop. This means that they need to be applied to the reconstructed frame at the encoder and decoder in order to use the same reference frames at the encoder and decoder. The aim of this post filtering is to remove compression artefacts.

Figure 2:
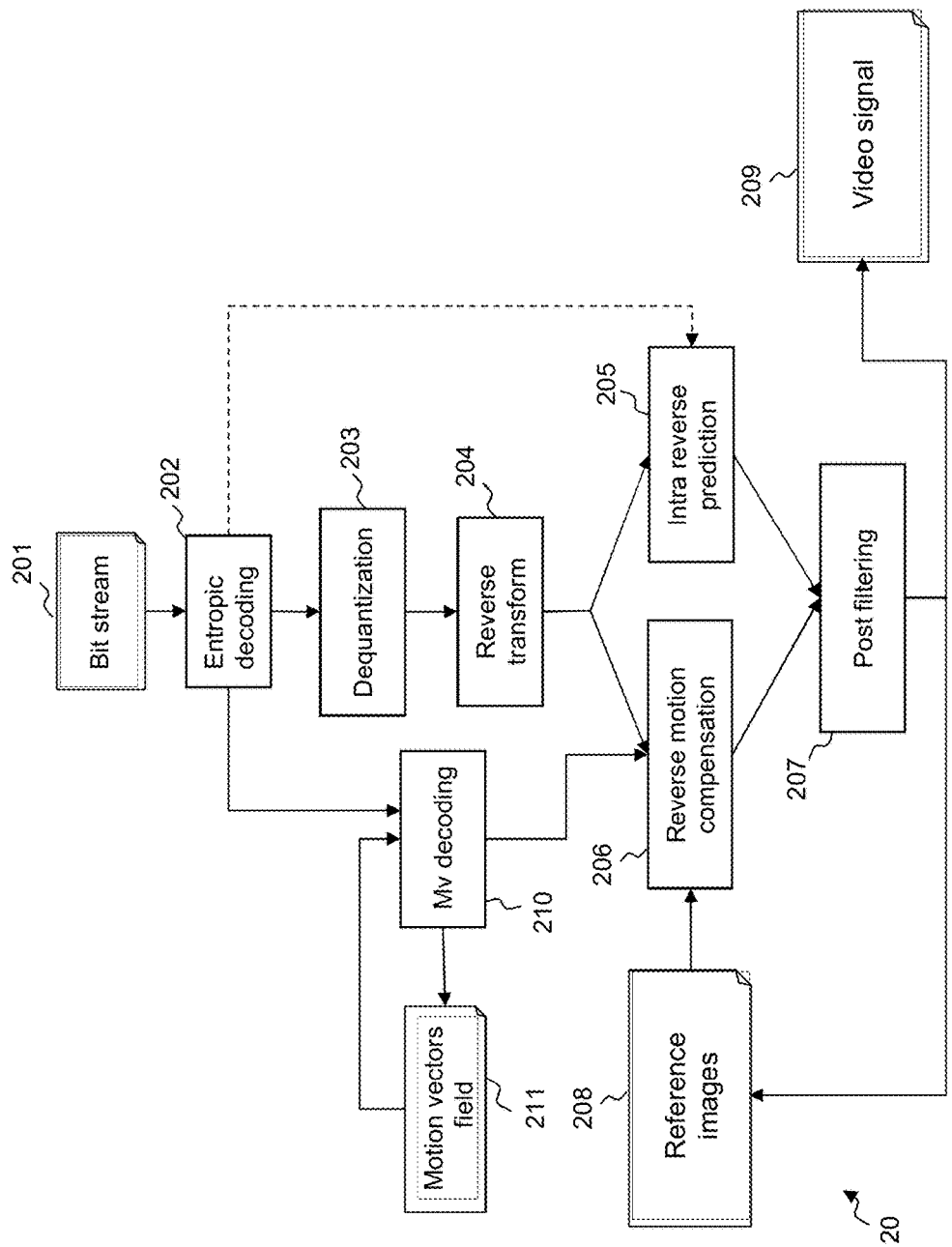
FIG. 2 illustrates the HEVC decoder architecture.

The principle of an HEVC decoder has been represented in FIG. 2. The video stream 201 is first entropy decoded in a module 202. The residual data are then inverse quantized in a module 203 and inverse transformed in a module 204 to obtain pixel values. The coding mode data are also entropy decoded and depending on the coding mode, an INTRA type decoding or an INTER type decoding or a Palette type decoding is performed. In the case of INTRA mode, the INTRA prediction direction is decoded from the bitstream. The prediction direction is then used to locate the reference area 205. If the mode is INTER, the motion information is decoded from the bitstream 202. This is composed of the reference frame index and the motion vector residual. The motion vector predictor is added to the motion vector residual to obtain the motion vector 210. The motion vector is then used to locate the reference area in the reference frame 206. Note that the motion vector field data 211 are updated with the decoded motion vector in order to be used for the prediction of the next decoded motion vectors. This first reconstruction of the decoded frame is then post filtered 207 with exactly the same post filter as used at the encoder side. The output of the decoder is the de-compressed video 209.

Figure 3:
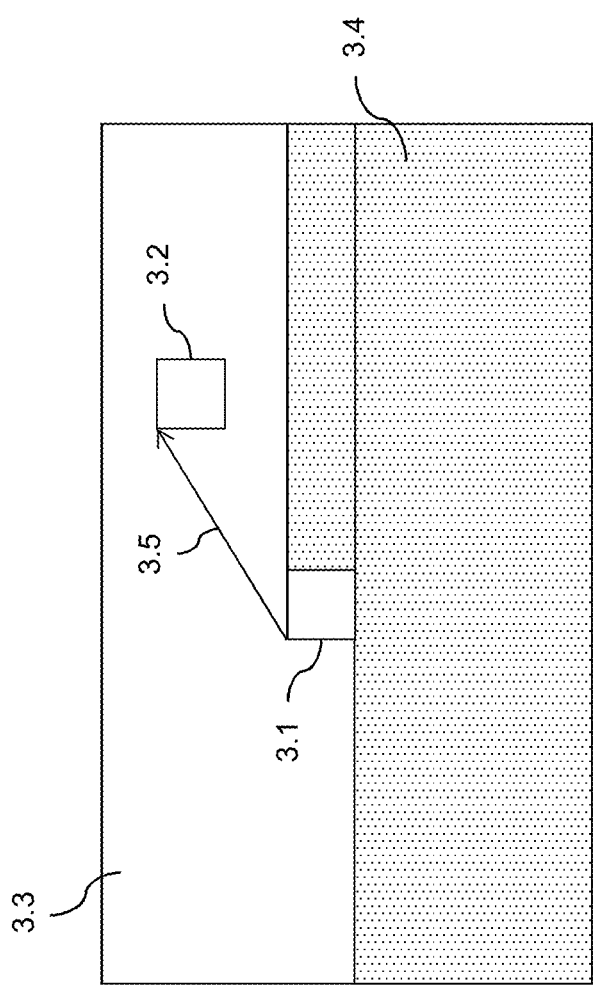
FIG. 3 illustrates the concept of the causal area.

FIG. 3 illustrates the causal principle resulting from block-by-block encoding as in HEVC.

At a high-level, an image is divided into Coding Units that are encoded in raster scan order. Thus, when coding block 3.1, all the blocks of area 3.3 have already been encoded, and can be considered available to the encoder. Similarly, when decoding block 3.1 at the decoder, all the blocks of area 3.3 have already been decoded and thus reconstructed, and can be considered as available at the decoder. Area 3.3 is called the causal area of the Coding Unit 3.1. Once Coding Unit 3.1 is encoded, it will belong to the causal area for the next Coding Unit. This next Coding Unit, as well as all the next ones, belongs to area 3.4 illustrated as a dotted area, and cannot be used for coding the current Coding Unit 3.1. It is worth noting that the causal area is constituted by reconstructed blocks. The information used to encode a given Coding Unit is not the original blocks of the image for the reason that this information is not available at decoding. The only information available at decoding is the reconstructed version of the blocks of pixels in the causal area, namely the decoded version of these blocks. For this reason, at encoding, previously encoded blocks of the causal area are decoded to provide this reconstructed version of these blocks. This is the decoding loop as mentioned above.

It is possible to use information from a block 3.2 in the causal area when encoding a block 3.1. In the HEVC Extension draft specifications, a displacement or motion vector 3.5, which can be transmitted in the bitstream, may indicate this block 3.2.

Figure 4:
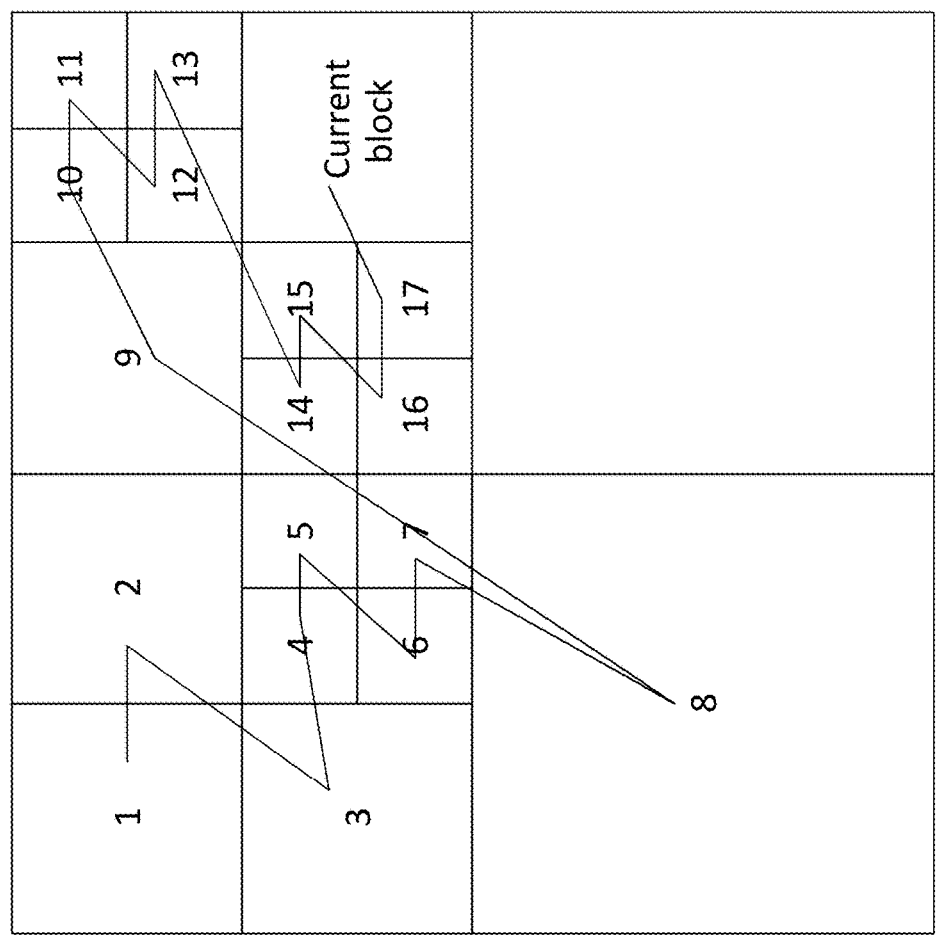
FIG. 4 illustrates the Coding Tree Block splitting into Coding Units and the scan order decoding of these Coding Unit.

FIG. 4 illustrates a splitting of a Coding Tree Block into Coding Units and an exemplary scan order to sequentially process these Coding Units. In the HEVC standard, the block structure is organized by Coding Tree Blocks (CTBs). A frame contains several non-overlapped and square Coding Tree Blocks. The size of a Coding Tree Block can range in size from 64×64 to 16×16. This size is determined at sequence level. The most efficient size, in term of coding efficiency, is the largest one: 64×64. Note that all Coding Tree Blocks have the same size except for the image border, meaning that they are arranged in rows. The size of the border CTBs is adapted according to the number of remaining pixels.

Each Coding Tree Block contains one or more square Coding Units (CU). The Coding Tree Block is split based on a quad-tree structure into several Coding Units. The processing (coding or decoding) order of each Coding Unit in the Coding Tree Block follows the quad-tree structure based on a raster scan order. FIG. 4 shows an example of the processing order of Coding Units. In this figure, the number in each Coding Unit gives the processing order of each corresponding Coding Unit of this Coding Tree Block.

In HEVC, several methods are used to code the different syntax elements, for example block residuals, information on predictor blocks (motion vectors, INTRA prediction directions, etc.). HEVC uses several types of entropy coding such as the Context based Adaptive Binary Arithmetic Coding (CABAC), Golomb-Rice Code, or simple binary representation called Fixed Length Coding. Most of the time a binary encoding process is performed to represent the different syntax elements. This binary encoding process is also very specific and depends on the different syntax element.

The HEVC Screen Content Coding Extension, also commonly called HEVC SCC, is an extension that is currently being drafted for the new video coding standard HEVC. It is derived from the HEVC Range Extension, also commonly called HEVC RExt.

An aim of this extension is to provide additional tools to encode video sequences in particular for the 4:4:4 colour format with 8 bits of bit-depth, and possibly losslessly, containing contents such as graphical user interfaces captures, computer-graphic generated content, etc. (known as Screen Contents).

A colour image is generally made of three colour components R, G and B. These components are generally correlated, and it is very common in image and video compression to de-correlate the colour components prior to processing the images. The most common format that de-correlates the colour components is the YUV colour format. YUV signals are typically created from RGB representation of images, by applying a linear transform to the three inputs R, G and B input frames. Y is usually called Luma component, U and V are generally called Chroma components. The term 'YCbCr' is also commonly used in place of the term 'YUV'.

HEVC SCC, beside lossy compression, is also able to provide a lossless encoding of the input sequences; this is to have a decoded output 209 strictly identical to the input 101.

To achieve this, a number of tools have been modified or added, compared to the conventional HEVC RExt lossy codec.

Additional tools for HEVC SCC are currently being designed to efficiently encode "screen content" video sequences in addition to natural sequences. As briefly introduced above, the "screen content" video sequences refer to particular video sequences which have a very specific content corresponding to those captured from a personal computer of any other device, containing for example text, PowerPoint presentation, Graphical User Interface, tables (e.g. screen shots). These particular video sequences have quite different statistics compared to natural video sequences. In video coding, performance of conventional video coding tools, including HEVC, proves sometimes to be underwhelming when processing such "screen content".

The tools currently discussed on in HEVC SCC to process "screen content" video sequences include the Adaptive Color Transform, the Intra Block Copy mode and the Palette mode. Prototypes for these modes have shown good coding efficiency compared to the conventional method targeting natural video sequences. An application of the present invention focuses on the Palette coding mode.

The Palette coding mode of HEVC SCC is a coding mode, meaning that the information directly codes pixel data. As currently drafted, the Palette coding mode does not use residual data, but uses an "escape coding" when a pixel does not match an entry of the palette currently used. In particular, in case of lossless coding, this means the palette entry to be selected by the encoder should be equal to the pixel considered, and in case no palette entry equals the pixel, the latter is escape-coded and its pixel value (e.g. three colour components) is not quantized and transmitted as such, the quantizer value being transmitted at the CU level. In case of lossy coding, a quantization may be implemented and/or the matching between a palette entry and a pixel considered may be approximating.

Figure 6:
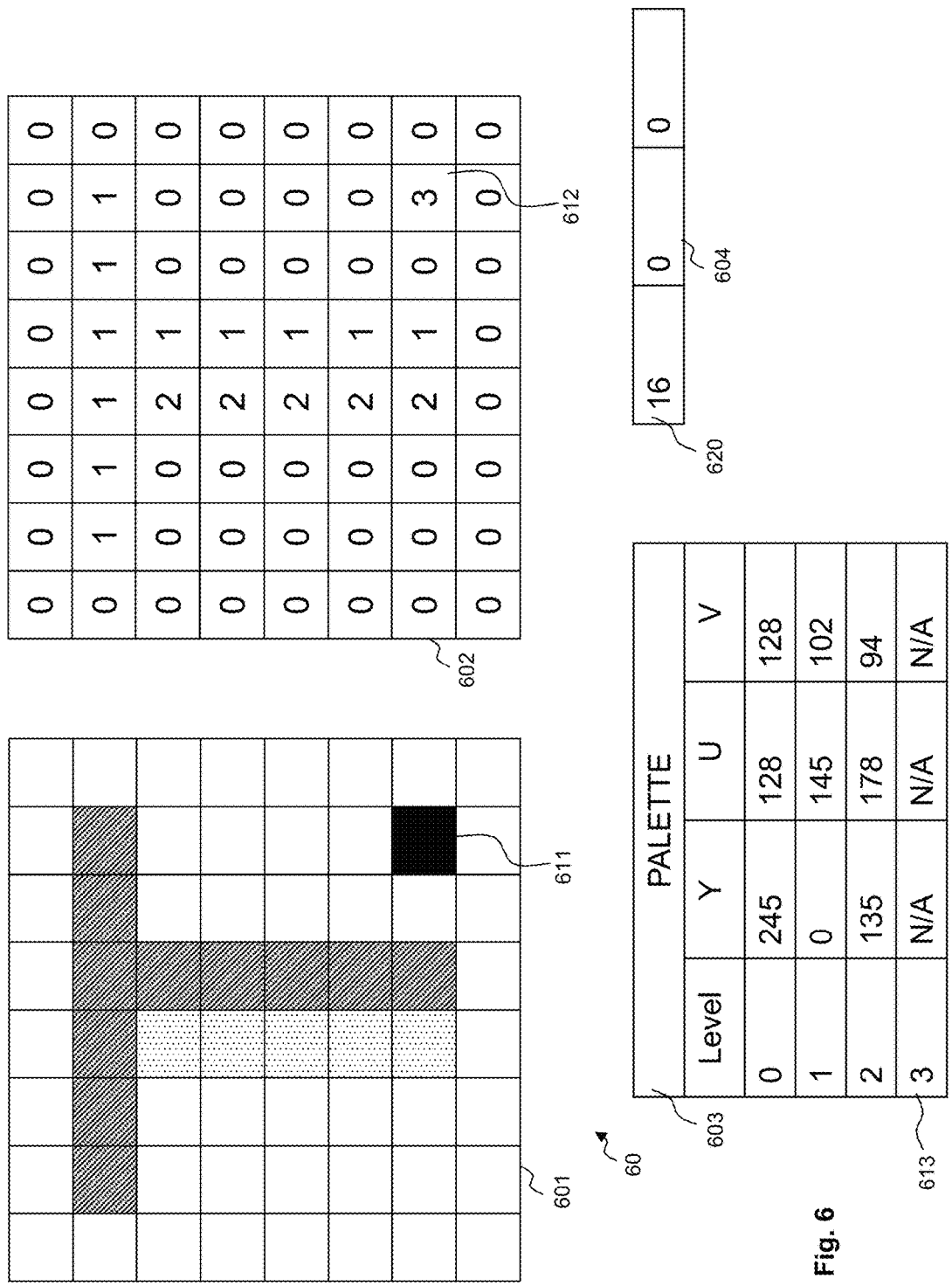
FIG. 6 illustrates an example of a coding unit with its corresponding block of levels and the associated palette.

A palette is generally represented by a table containing a finite set of N-tuple of colours, each colour being defined by its colour components in a given colour space (see for example 603 in FIG. 6 based on YUV colour space). For example, in a typical RGB or YUV format, the palette is composed of a list of P elements of N-tuple (where N=3 for RGB or YUV). More precisely, each element corresponds to a fixed triplet of colour components in the RGB or YUV format. Of course this is not limited to a RGB or YUV colour format. Any other colour format can be represented by a palette and can use a smaller or a higher number of colour components, meaning that N may be different from 3.

At the encoder side, the Palette coding mode, under consideration in HEVC SCC, consists in transforming pixel values of a given input 4:4:4 coding unit into indexes called levels. The levels identify the entries in an associated palette, the pixel values (or colour component values) of which match the pixel values of the input coding unit. However, when a pixel value of the input coding unit cannot be represented by a level (i.e. it does not match the pixel values), e.g. because the distortion would be too large (greater than 0 in case of lossless coding), then said pixel is represented by a specific level, indicating "escape coding". For each pixel being represented by this specific "escape coding" level, quantized pixel values are furthermore transmitted in a block of quantized values.

After the palette-based transformation, the resulting coding unit is thus composed of a block of levels and a block of quantized values (for the escape-coded pixels). It is then transmitted to the decoder with the associated palette, generally a table having a finite number of triplets of colours used to represent the coding unit. Since the palette defines a finite number of colours, the transformation into a block of indexes usually approximates the original input coding unit in lossy coding, but strictly corresponds to the original input coding unit in lossless coding.

To apply the Palette mode at the encoder side, an exemplary way to transform a coding unit of pixels is performed as follows:
  find the P colour triplets best describing the coding unit of
    pixels to encode, for example by minimizing overall
    distortion;
  then associate a respective palette entry from among the
    P triplet entries with each pixel of the coding unit, the
    colour triplet of the palette entry matching the pixel
    colour triplet: the value to encode (or level) (which thus
    forms part of the block of indexes or levels) is then the
    index corresponding to the palette entry having the
    matching colour. The block of indexes is thus obtained
    from the palette by comparing the entries of the palette
    to each pixel of the coding unit, in order to identify, for
    each pixel, the entry which best matches its pixel colour
    components. If no entry matches, then the level indi-
    cating escape coding is associated with the pixel (in the
    block of levels). The quantized pixel values corre-
    sponding to the escape-coded pixel may thus be stored
    in the block of quantized values, different from the
    block of levels.

For each coding unit, the palette (i.e. the P colour triplets found), the block of indexes or levels and the block of quantized pixel values are coded in the bitstream 110 and sent to the decoder.

Furthermore, specific flags may be provided in some sets of parameters in the bitstream to specify whether or not the Palette coding mode is activated (for instance in the Sequence Parameter Set, or "SPS"). Those sets of parameters are also referred to as syntax structures.

Also, at the coding unit level, a flag may specify whether or not the coding unit has escape-coded values, to force the palette to include the above-mentioned specific "escape coding" level.

At the decoder, the Palette coding mode consists in performing the conversion in the reverse way. This means that each decoded index associated with each pixel of the coding unit is replaced by the corresponding colour in the palette decoded from the bitstream, in order to reconstruct the corresponding colour for each pixel of the coding unit. Note that if a pixel is associated with the "escape coding" level, then the corresponding quantized pixel value (e.g. three colour components) is decoded and inverse quantized from the block of quantized pixel values (i.e. of escape-coded pixels). This is the reconstruction of the block of indexes in the colour space (i.e. of the coding unit predictor).

Figure 5A:
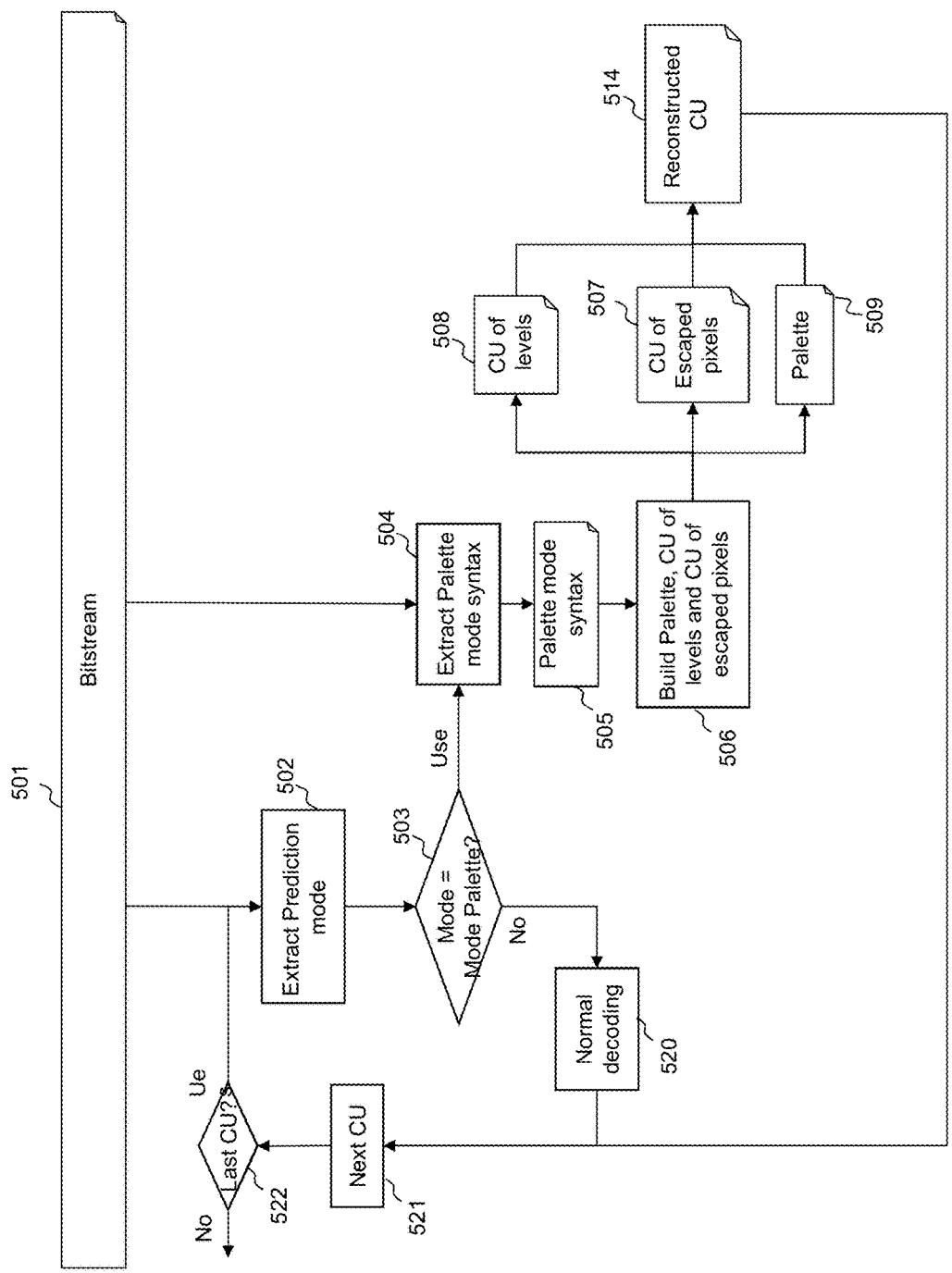
FIG. 5a illustrates the principle of Palette coding mode at the decoder side according to HEVC SCC.

FIG. 5a further illustrates the principle of the Palette coding mode at the decoder. When decoding a slice, frame or tile, the decoding process loops over the CUs from the bitstream 501, starting from a first coding unit. Then, the prediction mode for the current coding unit is extracted at step 502 from the bitstream 501. Currently, the Palette coding mode is identified by a flag located after the skip flag and the intra block copy flag in the bitstream (the other coding modes have been described above with reference to FIGS. 1 and 2). This flag is CABAC coded using a single context. If this mode is not the Palette coding mode (test 503), then conventional decoding occurs at step 520. Otherwise, the related syntax of the Palette coding mode 505, i.e. the information on the palette, the block of levels and the block of escape-coded pixels (quantized values), is extracted and decoded 504 from the bitstream 501.

Next, during step 506, the following elements are built from the data decoded at step 505: the palette 509, the block of escape-coded pixels 507 and the block of levels 508. From the block of levels, the associated palette and the block of escape-coded pixels, the reconstructed coding unit in pixel domain 514 is built. This means that for each pixel of the coding unit, the corresponding level in the block of levels is converted into a colour (RGB or YUV) using the palette.

FIG. 6 illustrates the principle of the Palette coding mode at the encoder, the palette being already built. The current coding unit 601 is converted into a block 602 of the same size which contains a level for each pixel instead of three colour values (Y, U, V) or (R, G, B). For means of illustration, pixel 611 of 601 is actually escape-coded and therefore, its associated level 612 indicates the escape coding level 613 (value "3") of the palette. As a consequence, block 604 of escape-coded pixels contains the quantized pixel value 620 of a single pixel.

Note that the palette 603 associated with block of levels 602 may be built based on coding unit overall distortion minimization and may thus associate, in each entry, an entry index or level with corresponding pixel colour values.

As mentioned above in relation to FIG. 5a, the palette (as well as the block of escape-coded pixels) is coded and inserted into the bitstream for each coding unit. In the same way, the block of levels (corresponding to the coding unit) is coded and inserted into the bitstream and an example of the coding is given below with reference to FIG. 7. In this example, the block of levels is scanned in a horizontal order.

In this example, the block of levels 71 is exactly the same as the one illustrated in FIG. 6 under reference 602. The tables 72 and 73 describe the successive syntax elements used to code the block of levels 71. Table 73 should be read as the continuation of table 72. The syntax elements in the table correspond to the encoding of the groups of levels surrounded by bold lines in the block 71.

Indeed, the block of levels is encoded by group of successive pixels in scan order (e.g. row by row, column by column, etc). Each group is encoded using a first syntax element giving a prediction direction, a second element giving the repetition, and an optional third element giving the value of the pixel, namely the level. The repetition corresponds to the number of pixels in the group.

These two tables represent the current syntax associated with the Palette coding mode. These syntax elements correspond to the encoded information inserted in the bitstream for the block of levels 71. In these tables, the three main syntax elements are used to fully represent the operations of the Palette coding mode and are used as follows when successively considering the levels of the block of levels 71.

The first syntax element, called "Pred mode" makes it possible to distinguish between two encoding modes. In a first mode corresponding to "Pred mode" flag equal to "0", a new level is used for the current pixel. The level is immediately signalled after this flag in the bitstream. In a second mode corresponding to "Pred mode" flag equal to "1", a "copy up" mode is used. More specifically, this means that the current pixel level corresponds to the level of the pixel located at the line immediately above starting on the same position for a raster scan order. In that case of "Pred mode" flag equal to "1", there is no need to signal a level immediately after the flag because the value of the level is known by reference to the value of the level of the pixel just above in the block of levels 71.

The second syntax element called "Level" indicates the level value of the palette for the current pixel only in the first mode of "Pred mode", or the level value for escape-coding of the pixel.

The third syntax element, called "Run", is used to encode a repetition value in both modes of "Pred mode". Considering that the block of levels 71 is scanned from the top left corner to the bottom right corner, row by row from left to right and top to bottom, the Run syntax element gives the number of successive pixels in block 71 having the same encoding.

The "Run" syntax element has a different meaning depending on the "pred mode" flag. When Pred mode is 0, "Run" element is the number of successive pixels of the block of indexes having the same level value. For example, if Run=8 this means that the current "Level" is applied to the current pixel and to the following eight pixels which corresponds to ninve identical successive samples in raster scan order.

When Pred mode is 1, "Run" element is the number of successive pixels of the block of indexes having a level value corresponding to the level value of their above pixel in block 71, i.e. where the "copy up" mode is applied. For example, if Run=26 this means that the level of the current pixel is copied from the pixel of the line above as well as the following 26 pixels which corresponds to 27 pixels in total.

Tables 72 and 73 represent the nine steps to represent the block 71 by using the Palette coding mode. Each step starts with the coding of the "Pred mode" flag which is followed by the "Level" syntax element when "Pred mode" flag equals "0", or by the "Run" syntax element when "Pred mode" flag equals "1". The "Level" syntax element is always followed by a "Run" syntax element.

When the prediction mode decoded for the current block is the palette coding mode, the decoder first decodes the syntax relating to this block and then applies the reconstruction process for the coding unit.

The additional tools of HEVC SCC, such as the palette coding mode, have originally been provided for 4:4:4 signals as mentioned above. Since then, slight adaptations have been provided to allow subsampled contents, such as 4:2:2 or 4:2:0 for instance, to be processed.

Figure 8:
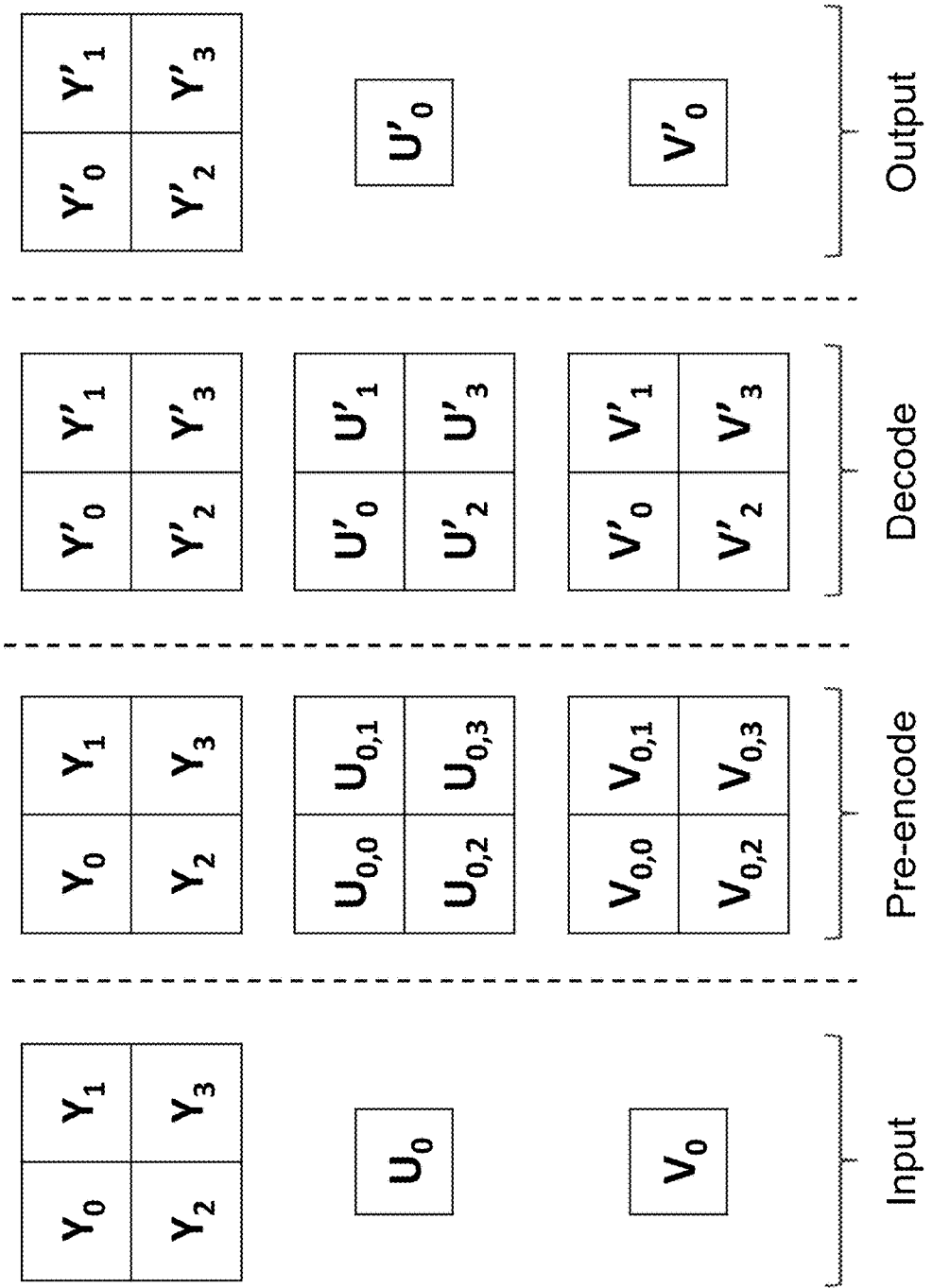
FIG. 8 illustrates the processing of a block of pixels conforming to the 4:2:0 sampling scheme, to be encoded with the palette coding mode.

FIG. 8 illustrates how a 4:2:0 content is processed to apply the palette coding mode.

The Figure illustrates a 2×2 input block of pixels, represented under the 4:2:0 Chroma sampling scheme, according to which a 2×2 block of Luma samples or values $Y_0$-$Y_3$ and two Chroma samples or values $U_0$,$V_0$ (one per Chroma colour component) are provided. The 2×2 input block of pixels is therefore represented as the input set of samples $\{Y_0, Y_1, Y_2, Y_3\}$ and $U_0/V_0$, meaning that pixel 0 has three colour components $Y_0U_0V_0$ and each of pixels 1,2,3 has a single Luma component $Y_{1-3}$ due to the Chroma subsampling. This block is the input block received by the encoder to encode it, in particular using the palette coding mode. Note that the output block or set of samples (right part of the Figure) should consequently follow the same 4:2:0 Chroma sampling scheme.

The normative parts of the palette coding mode are provided for a 4:4:4 "Decode" block of pixels, on which a subsampling should be applied in order to obtain a 4:2:0 or the like "output" block as shown in the Figure. Although not defined in the standard, a symmetrical and reverse operation should be performed on the input block that has the same sampling scheme as the output block: the input block or set of samples, no matter it is conforming to a 4:2:0 or 4:2:2 sampling scheme, is up-sampled into a so-called pre-encode block or set of samples conforming to the 4:4:4 sampling scheme, as shown in the Figure. It means that the pre-encode block has no subsampling of the colour components forming the pixels (e.g. Chroma component).

The "Decode" block of pixels or set of samples, which conforms to the 4:4:4 sampling scheme, is the result of the palette coding mode, i.e. after encoding and decoding using the palette coding mode. In other words, this is the block that is obtained by the decoder when processing the decoding of the bitstream. The "Decode" block or set of samples represents what the palette coding mode in HEVC handles internally, before it takes into account the Chroma sampling scheme of the input or output; typically, both the encoder and decoder have that version of the block of pixels.

The colour component values of the "Decode" block of pixels may differ from the values of the "Pre-encode" or "Input" blocks, in particular in case of lossy compression: for instance $Y'_0$ may differ from $Y_0$.

As the input Chroma format is not 4:4:4, the output Chroma format must not be 4:4:4 but must conform to the same sampling scheme as the input block. As a consequence, the $\{U'_0, U'_1, U'_2, U'_3\}$ and $\{V'_0, V'_1, V'_2, V'_3\}$ values of the Decode block or set of samples must be down-sampled into the input sampling scheme. To achieve this, the decoder (and corresponding encoder in the decoding loop) discards well-defined Chroma values.

For the 4:2:0 Chroma sampling scheme of the present example, $U'_1, U'_2, U'_3$ and $V'_1, V'_2, V'_3$ values are discarded, and only $U'_0$ and $V'_0$ values are kept. The "Output" block of pixels as shown in the Figure is thus obtained, which corresponds to the final output version of the "Input" block.

The above shows the process for applying the palette coding mode in case the input block of pixels conforms to an input sampling scheme having subsampling of at least one colour component, here Chroma components. In particular, from among the component values handled internally by the palette coding mode, some are discarded at the end to obtain the output block of pixels.

In operation, the palette coding mode actually encodes the sets of samples $\{Y_0, U_{0,0}, V_{00}\}, \{Y_1, U_{0,1}, V_{0,1}\}, \{Y_2, U_{0,2}, V_{0,2}\}$ and $\{Y_3, U_{0,3}, V_{0,3}\}$. Ideally, $U'_0$ is as close as possible to $U_0$, and thus so is $U_{0,0}$. The known techniques conventionally use $U_0$ and $V_0$ values to set $U_{0,1}/U_{0,2}/U_{0,3}$ and $V_{0,1}/V_{0,2}/V_{0,3}$ values for the pre-encode block or set of samples. Then, the internal operations of the palette coding mode consider all of the pre-encode values with the same importance, because the palette coding mode does not make distinction between input pixel component values and those that are generated by the up-sampling process from the input block to the pre-encode block.

However, as the Chroma samples values of pixels 1 to 3, $U_{0,1}/U_{0,2}/U_{0,3}$ and $V_{0,1}/V_{0,2}/V_{0,3}$, are discarded at the end, it is assumed their value has little to no importance. It means that conventional approaches, when considering all the pixel component values with the same importance, perform sub-optimal encoding. To illustrate this, a first example is given: when determining the best index (i.e. palette entry) for a pixel currently considered, the distortion between the input pixel colour components and the output pixel colour components (i.e. palette entry) is measured, which includes taking into account $U_{0,1}/U_{0,2}/U_{0,3}$ and $V_{0,1}/V_{0,2}/V_{0,3}$ although they are not critical in the output block (because they are discarded beforehand).

Such discarded colour component values may be used for several evaluations of measures, such as error or distortion measures, throughout the operations of palette coding mode between the pre-encode block and the decode block of FIG. 8. Examples of these evaluations include an updating of the colour component values of a palette entry when building the palette; evaluating distortion measures when selecting the closest palette entry to a pixel currently considered; evaluating distortion measures when determining whether a palette entry predictor may be used instead of a palette entry.

To adjust the influence of the discarded colour components in those evaluations, embodiments of the invention provides that weights are assigned to the values of the colour components of the pre-encode pixels depending on whether the corresponding values of the same colour components exist or not (i.e. is discarded or not) in the corresponding input pixels due to the normative subsampling in the output of the decoding process (which symmetrically corresponds to the fact that the input block is subsampled, compared to the "Pre-Encode" set of samples). It results that the measure can be evaluated using the weighted values of the pre-encode pixels. By setting appropriate weights, the adjusting can be finely tuned.

Such approach is illustrated below for each of the three exemplary evaluations mentioned above: the updating of the colour component values of a palette entry with reference to FIG. 9; the evaluation of distortion measures when selecting the closest palette entry to a pixel currently considered, with reference to FIG. 10; and the evaluation of distortion measures when determining whether a palette entry predictor may be used instead of a palette entry, with reference to FIG. 11.

Figure 9:
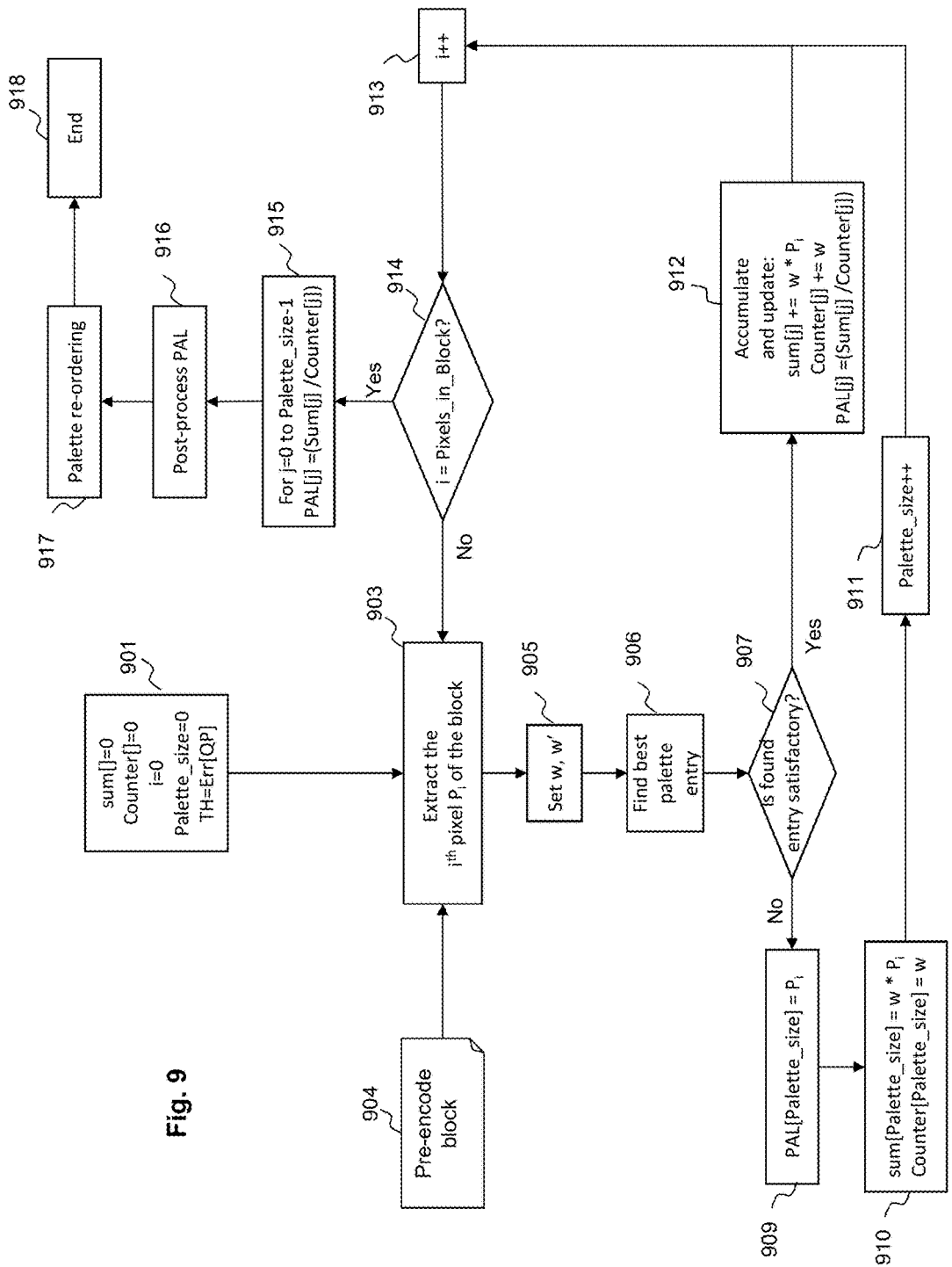
FIG. 9 illustrates a palette determination algorithm at the encoder, according to embodiments of the invention.

FIG. 9 illustrates an exemplary palette determination algorithm at the encoder according to embodiments of the invention. The input data of this process are the pre-encode block of pixels and its coding unit size. Knowledge of the input block or the input sampling scheme is also required in order to know which colour component values of the pre-encode block are discarded component values according to the normative discarding step described in FIG. 8.

At a first step 901, a variable i representing a pixel counter is set to 0, a variable "Palette_size" to follow the growth of the palette as it is being built is also set to 0, and a variable "TH" representative of a threshold is defined, possibly depending on a quantization parameter QP. Furthermore, variables $sum_Y[\ ]$, $sum_U[\ ]$, $sum_V[\ ]$ are initialized to 0. $sum_{Y,U,V}[e]$ is used to sum the colour component values of all the pixels that are determined close to palette element 'e' at step 907, for respectively Luma component Y, first Chroma component U and second Chroma component V in the YUV colour space. To simplify the Figure, only sum[ ] is shown, which must be applied to each colour component. Equivalently, a sum of occurrences Counter[ ], representative of the $Counter_Y[\ ]$, $Counter_U[\ ]$ and $Counter_V[\ ]$ variables, is initialized to 0.

Then at step 903, the pixel $P_i$, i.e. having the index i according to a scanning order, is read from the pre-encode block of pixels 904. Step 905 sets at least one weight w for the current pixel depending on whether the pixel is originally subsampled in the input block or not. Determining whether a pixel is subsampled or not is quite easy. For instance, assuming the sampling scheme 4:2:0, pixels 1,2,3 have their Chroma values discarded.

A single weight w may be provided for the whole pixel. In a variant, weights are assigned to each of the colour components of pixel $P_i$, namely $w_Y$, $w_U$, $w_V$ for respectively Luma component Y, first Chroma component U and second Chroma component V. These weights are schematically illustrated by weight 'w' in the Figure, in a similar fashion to 'sum[ ]'.

Weight w or weights $w_Y$, $w_U$, $w_V$ are used at steps 910, 912 and 915 explained below.

Optionally, a second weight w' or second weights $w'_Y$, $w'_U$, $w'_V$ may also be defined for current pixel $P_i$ to be used during step 906, an embodiment of which is described with reference to FIG. 10. Examples of these second weights are also provided below with reference to this Figure.

In the process of FIG. 9, the colour components are handled separately (meaning that their values are never mixed, for instance during calculating a measure). As a consequence, the respective weights may be handled separately.

Luma weight $w_Y$ is for instance always 1. As, in 4.2.0 scheme, all the pixels have their Luma component, no particular weighting of it is required.

This is not the case for the two Chroma components. Preferably, a first weight assigned to the value of a colour component of a first pre-encode pixel which corresponds to an input pixel having a value for the same colour component (i.e. a non-discarded colour component value) is higher than a second weight applied to the value of the same colour component of a second pre-encode pixel which corresponds to an input pixel having no value for the same colour component. In other words, Chroma weight $w_{U,V}$ is made larger for non-discarded Chroma component values, i.e. for pixel 0 in the 4:2:0 scheme.

The selection of the weights may depend on a number of choices or parameters. For instance, the bitdepths of the Luma and Chroma components, but also various states of the encoder, such as a quantizer, the number of pixels already processed, etc. may be taken into account.

In embodiments, the ratio between the first and second weights is a power of 2. For instance, the largest weight assigned to non-discarded Chroma values is a large power of 2, such as $2^5$ or $2^7$ to implement efficient optimizations during step 912. In that case, for discarded Chroma values, the weight may be set to 1, and thus the same weight is assigned to the two Chroma component values of a pre-encode pixel: $w_U=w_V$. Note that $w_U=w_V \neq 0$, meaning that the weight assigned to a value of a colour component (Chroma value here) of a pre-encode pixel is a non-zero weight when the corresponding input pixel does not have a value for the same colour component (which is thus subsampled).

This example shows that, for discarded colour components, different weights may be applied to Luma and Chroma values.

Next, step 906 determines the best level, i.e. palette entry, to describe current pixel $P_i$. For instance, it can be the first palette entry (according to the increasing palette entry indexes) that is distant at most of TH from $P_i$, or be the closest palette entry to current pixel $P_i$ from amongst all the palette entries already in the palette. Step 907 thus verifies whether a palette entry can be found that represents current pixel $P_i$ with sufficient accuracy.

Note, that the distance between the considered pixel and any palette element may be a L1 distance or a L2 distance between their colour component values.

In embodiments, step 906 is modified according to the weight-based teachings of the invention to take into account the cases where the Chroma values are discarded during decoding. This modification is explained below with reference to FIG. 10, which thus uses second weights $w'_Y$, $w'_U$, $w'_V$ introduced above.

In case no satisfactory palette entry has been found at step 906 (test 907 is negative), current pixel $P_i$ is added to the palette (noted PAL[ ] in the Figure) as a new palette element or entry, at step 909. Step 907 may for instance be whether one of the distances for a component is above a threshold, e.g. the absolute difference between $U_i$ and $PAL_U[j]$ of the best index j found on step 906.

Step 909 means that the palette entry at index "j" is set equal to the value of current pixel $P_i$, and current pixel $P_i$ becomes a new element in the palette, with index j associated with it. More precisely the following assignment may be performed:

$PAL_Y[\text{Palette\_size}]=(Yi);$ $PAL_U[\text{Palette\_size}]=(Ui);$ and $PAL_V[\text{Palette\_size}]=(Vi)$ where $PAL_{Y,U,V}$ are three tables to store the colour values. Current pixel $P_i$ is thus associated with the new palette entry.

At step 910, variables $Counter_Y$, $Counter_U$, $Counter_V$ for this new palette entry are set equal to respectively $w_Y$, $w_U$, $w_V$. These counters (shown as 'Counter' in the Figure) are used to count a weighted number of pixels associated with each colour component of the palette entry considered. Also at step 910, the variables "sum" for the new palette entry are set equal to the corresponding component value of current pixel Pi:

$sum_U[\text{Palette\_size}]=(Yi);$ $sum_U[\text{Palette\_size}]=(Ui);$ and $sum_V[\text{Palette\_size}]=(Vi).$ Next, step 911 increments the Palette_size variable to indicate that the palette has grown by one new entry. Next step is step 913.

In case a satisfactory palette entry has been found at step 906 (test 907 is positive), step 912 occurs in which current pixel $P_i$ is associated with palette entry T, and the variables $Counter_{Y,U,V}[j]$ and the sums of colour component values $sum_{Y,U,V}[j]$ are updated. According to the invention, these updates take into account the weights assigned to the colour component values at step 905.

As shown in the Figure, a weighted sum of the values of each colour component for all the pre-encode pixels associated with the palette entry considered is calculated: $sum_Y[j]=sum_Y[j]+w_Y*Y_i$ (to be duplicated with U and V components).

In addition, $Counter_Y$ (to be duplicated with U and V) counts the weighted number of pixels considered for corresponding $sum_Y$, by summing the weights of all the associated pixels for the colour component considered: $Counter_Y[j]=Counter_Y[j]+w_Y$.

In a further embodiment, $w_U=w_V=w_c$, and the updates are respectively:

$sum_u[j]=sum_u[j]+w_c*U_i$ for the $U$ component $sum_v[j]=sum_v[j]+w_c*V_i$ for the $V$ component $counter_c[j]=counter_c[j]+w_c$ for both $U$ and $V$ components.

Optionally, step 612 may include updating the palette entry by calculating updated pixel colour component values for the palette entry when building the palette, based on the weighted values of pre-encode pixels associated with said palette entry. This is an evaluation of a measure as mentioned above.

For instance, the result of the division of each weighted sum by the corresponding weighted number of pixels can provide an updating value:

$PAL_{Y,U,V}[j]=sum_{Y,U,V}[j]/Counter_{Y,U,V}[j]$, for each Y, U, V colour components in the case of YUV colour space.

This represents weighted average values of the values of the colour components of the pre-encode pixels associated with said palette entry.

Next, the variable "i" is incremented by one at step 913 to consider the next pixel "i" of the current pre-encode block. When all the pixels have been considered (test step 914), step 915 is performed in order to modify each palette entry as described above for step 912, i.e. by computing a mean value: PAL[j]=sum[j]/Counter[j], or selecting the median value or the most probable value from the pixels associated with the palette entry considered, or any other averaging method. This makes it possible to obtain an averaging of each palette entry based on all the pixels that are associated with the palette entry (in particular when the PAL updating of step 912 is not done).

Next to step 915, an optional post-processing 916 of the palette may be performed. Such post-processing may include adding or removing or modifying some of the palette entries. For instance, palette entry predictors may be selected using the approach In embodiments, step 915 implements the weight-based teachings of the invention to take into account the cases where the Chroma values are discarded during decoding, for instance to use palette entry predictors instead of the palette entries built through steps 910, 912 and 915. These embodiments are illustrated below with reference to FIG. 11, which uses second weights $w'_Y$, $w'_U$, $w'_V$ introduced above.

Figure 10:
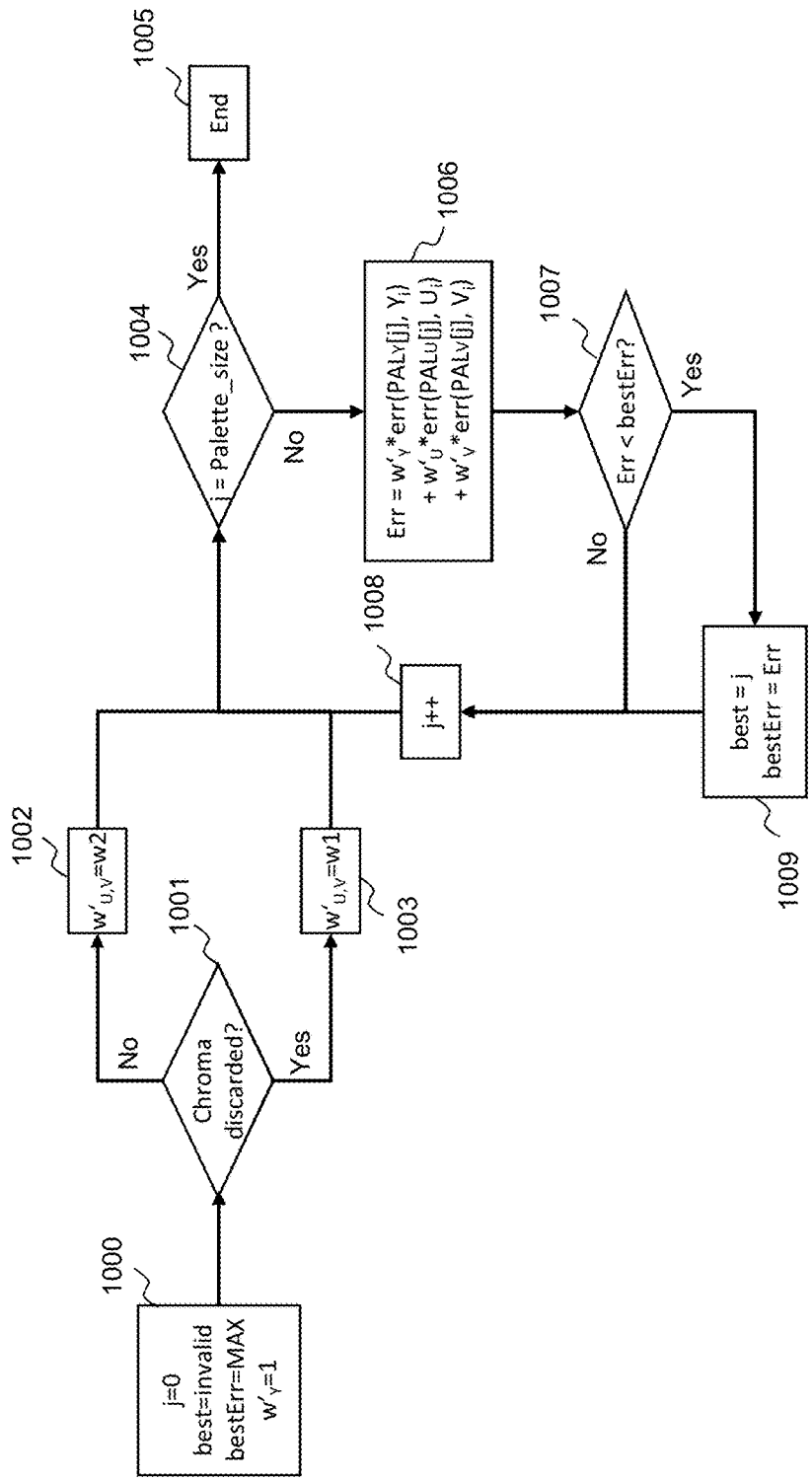
FIG. 10 illustrates an algorithm associating a pixel to a palette entry at the encoder, according to embodiments of the invention.

Turning now to FIG. 10, it is described the selection of a relevant palette entry for current pixel $P_i$ taking into account whether the Chroma value of the pixel is discarded or not. This selection is also known as the palettizing of a pixel, i.e. when mapping a pixel to an entry of the palette. The algorithm of FIG. 10 seeks to find the palette entry that minimizes a distortion with current pixel $P_i$. This algorithm may be implemented during step 906 of FIG. 9.

In this algorithm, as some measures performed mix colour components (see step 1006), the weights assigned to the colour component values should not be handled separately. For instance, the same weight could be assigned to the values of two colour components of a pre-encode pixel which corresponds to an input pixel having values for the same two colour components. This ensures those two colour components to be considered with the same importance in the measures performed. That is also why second weights $w'_{Y,U,V}$ (different from weights $w_{Y,U,V}$) are provided at step 905.

Due to the mix of component values in the measures, the selection and choice of second weights $w'_{Y,U,V}$ may also depend on the same choices or parameters as mentioned above for weights $w_{Y,U,V}$ (bitdepths, quantizer, etc.) but also on the distortion measure used (here at step 1006—which is for instance the absolute difference for L1 distance or the squared error for L2 distance), At step 1000, the search is initialized: the first palette entry is selected by setting the variable "j" to 0, the current best entry variable "best" is set to a value indicating no valid entry (e.g. −1) and the distortion variable "bestErr" for current best entry is set to the maximum value. This allows those variables to be set to the first palette entry considered, upon performing the following loop for first time.

In addition, the Luma weight $w'_Y$ is initialized here, preferably to 1.

Next, steps 1001 to 1003 consist to properly assign the weights to the Chroma components depending on whether they exist or are subsampled (discarded) in the corresponding pixel of the input block. This may be part of step 905. Thus, step 1001 determines whether the Chroma components are discarded or not, and then sets the Chroma weights $w_U$ and $w_V$ to the appropriate values: "w1" in case of discarding and "w2" in case of non-discarding.

To keep a ratio of a power of two between them, "w2" may be set to 1, while "w1" may be set to the inverse of a power of 2, e.g. $2^{-5}$ or $2^{-7}$, which allows efficient implementation of the weighting at step 1006.

It should be noted that "w1" and "w2" may change according to the distortion measure used in step 1006, and that the whole decision may be moved to after step 1004 (i.e., in the loop) to base the decision on further information, e.g. the number of pixels currently mapped onto the current palette entry. This may be due to the fact that a low number of pixels means the palette entry component values are not firmly set and may still evolve (e.g. due to the addition of the current pixel).

Next, step 1004 checks whether the last entry of the palette has been evaluated. If it is the case, the processing ends at step 1005, otherwise, an error is evaluated on step 1006. Here determining a palette entry for the pre-encode pixel currently considered is performed by evaluating a distortion measure between the pre-encode pixel and at least one palette entry using weighted values of colour components of the pre-encode pixel. The distortion measure "err" (which is the absolute difference for L1 distance or the squared error for L2 distance) is computed for each colour component YUV.

In particular, a weighted sum can be computed based on $w'_Y$, $w_U$ and $w'_V$, for instance $Err=w'_Y \cdot err(PAL_Y[j],Y_i) + w'_U \cdot err(PAL_U[j],U_i) + w'_V \cdot err(PAL_V[j],V_i)$ with $P_i=(Y_i,U_i,V_i)$. The resulting sum in the distortion measure "Err" for the whole current pixel $P_i$. Additionally, $w'_U=w'_V=w'c$, resulting in the above formula becoming $Err=w'_Y \cdot err(PAL_Y[j],Y_i) + w'_C \cdot err(PAL_U[j],U_i) + w'_C \cdot err(PAL_V[j],V_i)$.

For example $w'_Y$ is equal to 1.

The distortion measure is then compared to the distortion "bestErr" of the currently best entry (test 1007). If it is lower, then the best entry is updated by setting "best" to "j" (i.e. to save the palette entry currently considered) and "bestErr" to "best" at step 1009. Next, step 1008 selects the next palette entry by incrementing "j".

Figure 11:
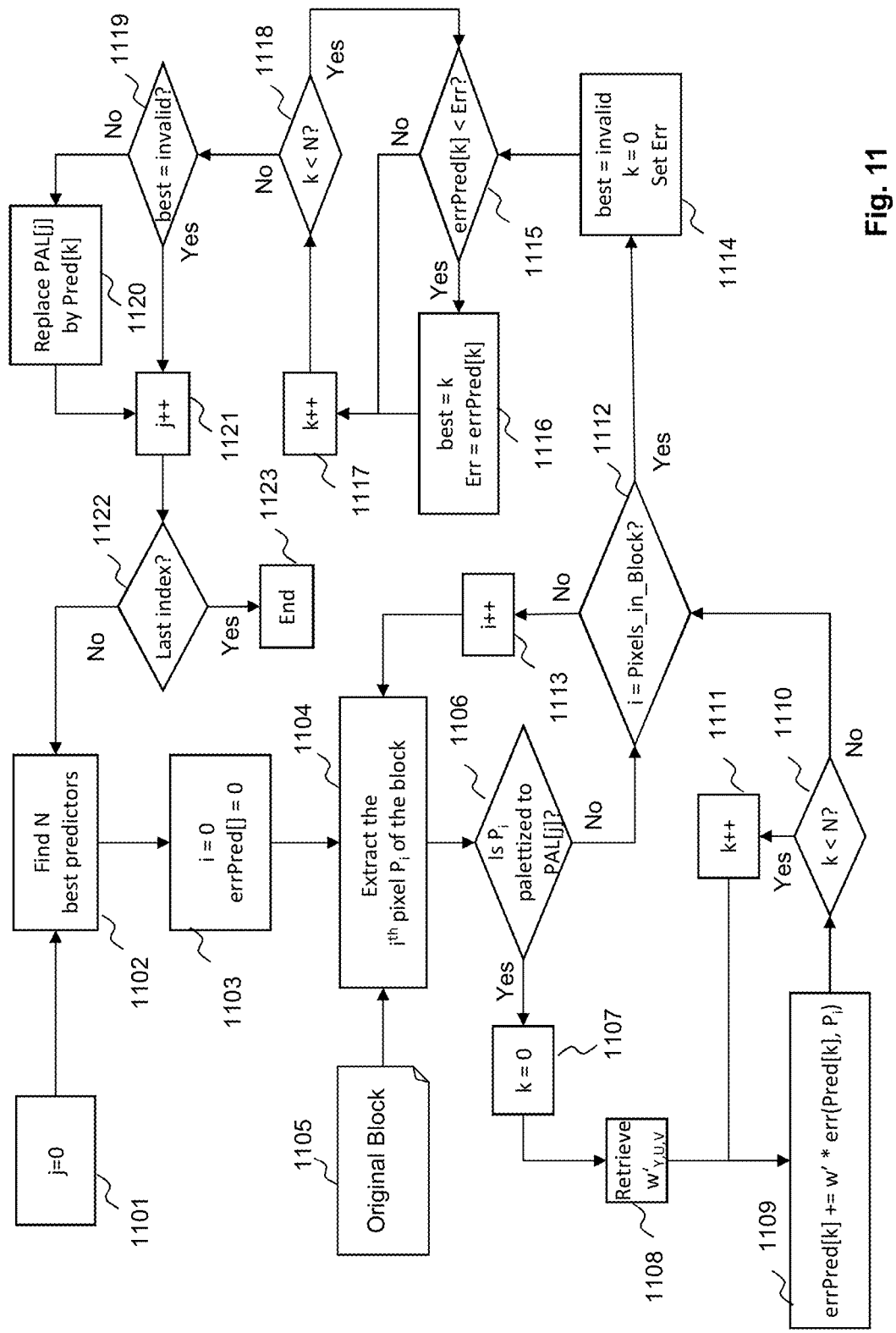
FIG. 11 illustrates an algorithm of palette prediction at the encoder, according to embodiments of the invention.

Turning now to FIG. 11, it is described an exemplary post-processing of the palette built, in particular when determining whether a palette entry predictor may be used instead of a palette entry. This is known as a palette prediction and takes place for instance during step 916. In particular, the opportunity to replace a palette entry by a palette entry predictor is evaluated by evaluating a distortion measure between at least one pre-encode pixel associated with the palette entry and at least one palette entry predictor using weighted values of colour components of the pre-encode pixel.

As for the algorithm of FIG. 10, as the distortion measure (see step 1109) mixes colour components, the second weights $w'_{Y,U,V}$ are preferably used.

The algorithm of FIG. 11 seeks to determine whether a palette entry predictor minimizes a distortion with current pixel $P_i$ compared to a current palette entry. To do so, it tests the rate-distortion impact of replacing the palette entries with some candidates from a palette predictor. In case of positive determination, the palette entry predictor may replace the current palette entry, thereby resulting in an improved coding efficiency.

In Applicant's contribution in JCT-VC (No. JCTVC-Q0063 entitled "AhG10: palette predictor stuffing", 17th Meeting: Valencia, ES, 27 Mar.-4 Apr. 2014), prediction of the current Palette for a current Coding Unit using a palette predictor has been proposed, for instance using the last Palette used (for the last processed Coding Unit).

The proposed approach aims at reducing the coding costs, since a palette is no longer fully explicitly transmitted for each Coding Unit. Indeed, referring to FIG. 5b, the palette of previous palette-coded block is used to update the palette predictor 560. Various ways to update the palette predictor may be contemplated, such as for instance setting the previous palette as the new palette predictor, or retrieving the N most relevant entries (most used) of the previous palette to replace the N least relevant entries (least used or oldest) of the palette predictor, etc.

Figure 5B:
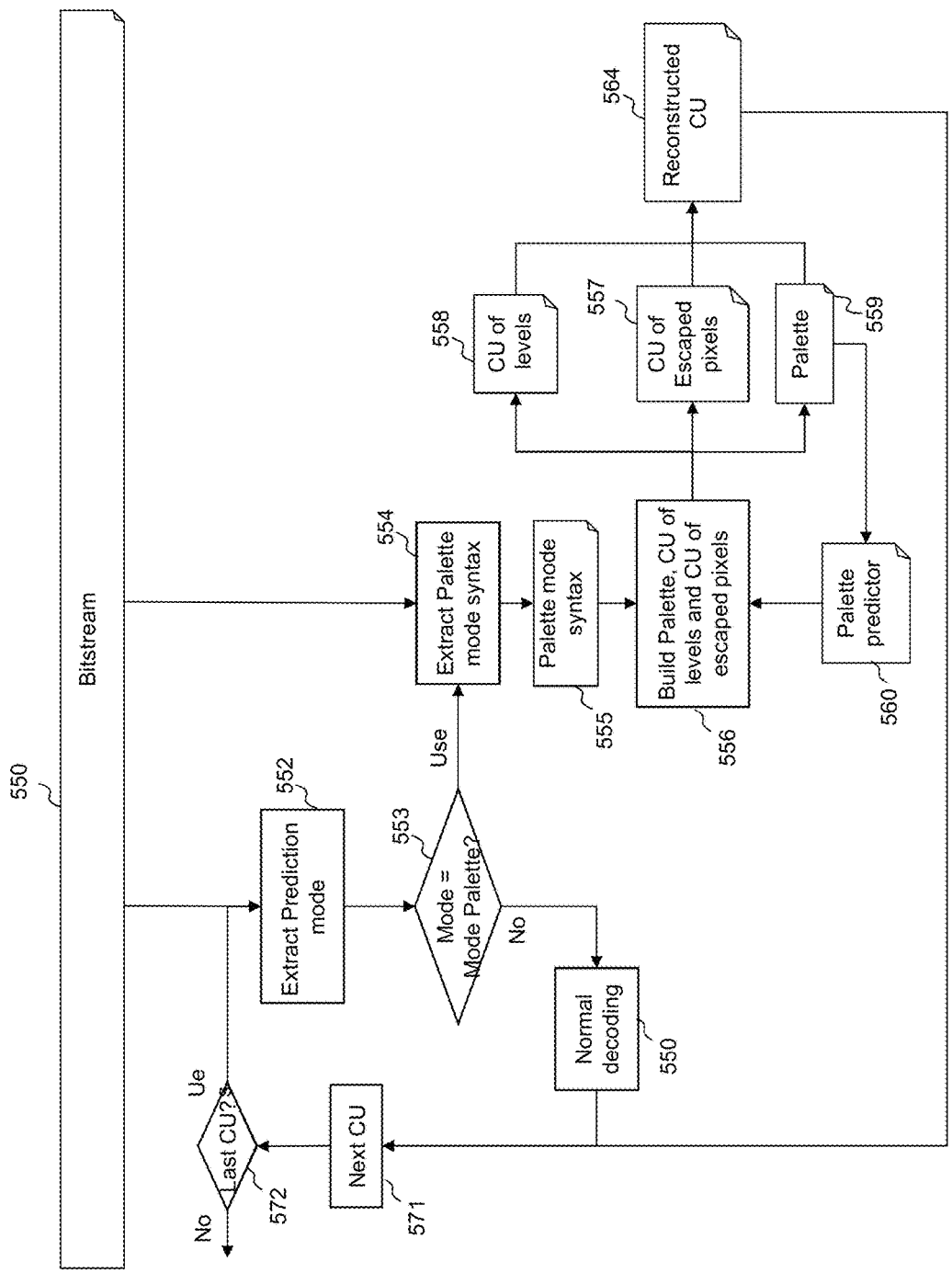
FIG. 5b illustrates a similar principle with use of a palette predictor.

Next, when it has been decided which entries of the palette predictor can be reused by the current palette, an appropriate flag may be provided for each entry of the palette predictor in the bitstream, thereby indicates whether that entry is reused or not. Besides predictor 560, all the other steps of FIG. 5b are identical to their equivalent step (whose number is decremented by 50) in FIG. 5a.

Referring to FIG. 11, at step 1101, the first entry of the current palette is selected by setting variable "j" to 0.

Step 1102 then finds "likely" candidates, i.e. entries of a palette predictor, for the current palette entry, i.e. if the candidates are within some reasonable distance (L1 or L2) from the current palette entry. Note that the number "N" of entry predictor candidates may actually be variable. Also note that all the entries of a considered palette predictor may be considered as candidates to simplify step 1102.

Step 1103 then initializes the loop investigating said palette entry predictor candidates by selecting the first pixel of the current pre-encode block (setting variable "i" to 0) and setting the initial error "errPred" for all candidates to 0.

Pixel "i" is then extracted from pre-encode block 1105 at step 1104.

Step 1106 then verifies whether current pixel $P_i$ is mapped onto palette entry 'j' or not, i.e. whether they are associated one with the other or not.

If not, processing continues to step 1112.

Otherwise, step 1107 selects the first palette entry predictor candidate by setting "k" to 0.

Step 1108 then retrieves the weights $w'_{Y,U,V}$ of the various colour components (as calculated at step 905). The same assignment process as the one of steps 1001 to 1003 may be performed, optionally taking also into account any interesting information, such as the number of pixels mapped onto PAL[j].

Next, the weighted distortion measure due to using current palette entry predictor Pred[k], with Pred[k]=(Pred$_Y$[k], Pred$_U$[k],Pred$_V$[k]), instead of using current palette entry PAL[j] to encode current pixel $P_i$ is evaluated, at step 1109. This evaluation uses the weighted colour component values of the current pre-encode pixel $P_i$. For instance, the weighted distortion measure equals: $w'_Y$·err(Pred$_Y$[k],Y$_i$)+$w'_U$·err(Pred$_U$[k],U$_i$)+$w'_V$·err(Pred$_V$[k],V$_i$) with Pred[k]=(Pred$_Y$[k], Pred$_U$[k],Pred$_V$[k]).

Still at step 1109, it is added to the current distortion errPred[k] due to using Pred[k] for the whole pre-encode block:

errPred[k]=errPred[k]+[$w'_Y$·err(Pred$_Y$[k],Y$_i$)+$w'_U$·err(Pred$_U$[k],U$_i$)+$w'_V$·err(Pred$_V$[k],V$_i$)].

In another embodiment, $w'_U$=$w'_V$=$w'_c$ and the formula becomes errPred[k]=errPred[k]+[$w'_Y$·err(Pred$_Y$[k],Y$_i$)+$w'_c$·err(Pred$_U$[k],U$_i$)+$w'_c$·err(Pred$_V$[k],V$_i$)].

For example $w'_Y$ is equal to 1.

Next, step 1110 verifies whether the last entry predictor candidate has been evaluated or not by comparing variable "k" to "N". If it is not the case, step 1111 increments "k" before looping back to step 1109.

At step 1112, the current pixel has been tested for all N candidates, and it is checked whether or not all the pixels of the pre-encode block have been tested.

If there is at least one pixel not yet evaluated, variable "i" is incremented at step 1113 to consider the next pixel in processing order. The process thus loops back to 1104.

Otherwise, all pixels of the pre-encode block have been analysed, and step 1114 is performed to initialize the final candidate check: the current best candidate is set to invalid (by setting "best" to "invalid"), and the first candidate is selected (by setting "k" to 0), and the initial best error "Err" is initialized to the distortion resulting from using the current palette entry PAL[j]. This initial best error is preferably the sum of all bestErr obtained at the end of the process of FIG. 10 for all the pixels palettized to PAL[j] (or may be obtained in a similar fashion).

Step 1115 then compares the distortion errPred[k] for candidate k to the best error 'err'. If it is lower than current best error, the best candidate is set to "k" and the best error to errPred[k] at step 1116.

After step 1116 or in if it errPred[k] is not lower than current best error, step 1117 selects the next candidate by incrementing k.

Next, step 1118 checks whether or not all the N candidates have been considered for evaluation.

If at least one candidate remains to be considered, processing loops back to step 1115.

Otherwise, at step 1119, if there is a better candidate than palette entry PAL[j] currently considered (i.e. if "best" has been set to another value than its initial value "invalid"), the current palette entry can be predicted. So, its value PAL[j] is set to Pred[k].

Next, the next palette entry is selected at step 1121 by incrementing "j".

Test 1122 checks whether there is palette entries not yet considered in which case the processing loops back to step 1102. Otherwise, the processing ends at step 1123.

The inventors have observed that application of this weight-based idea of the invention for the so-called palette coding mode can result in improved coding gain and/or distortion. In particular they have measured about 2% in gain for intra coding and about 1% in gain for low-delay.

The simple approach described above to provide and assign weights is mainly based on the discarding of a colour component in the input block of pixels.

However, the values of the assigned weights may be refined taking into account additional criterion or criteria. It could allow having different weights for discarded colour components.

An exemplary criterion is based on the sampling pattern applies to obtain the subsampled pixels (i.e. input or output block of pixels). Indeed, a sampling pattern defines how the colour components of the pixels are organised and spatially positioned in a block, and several sampling patterns exist.

Figure 12:
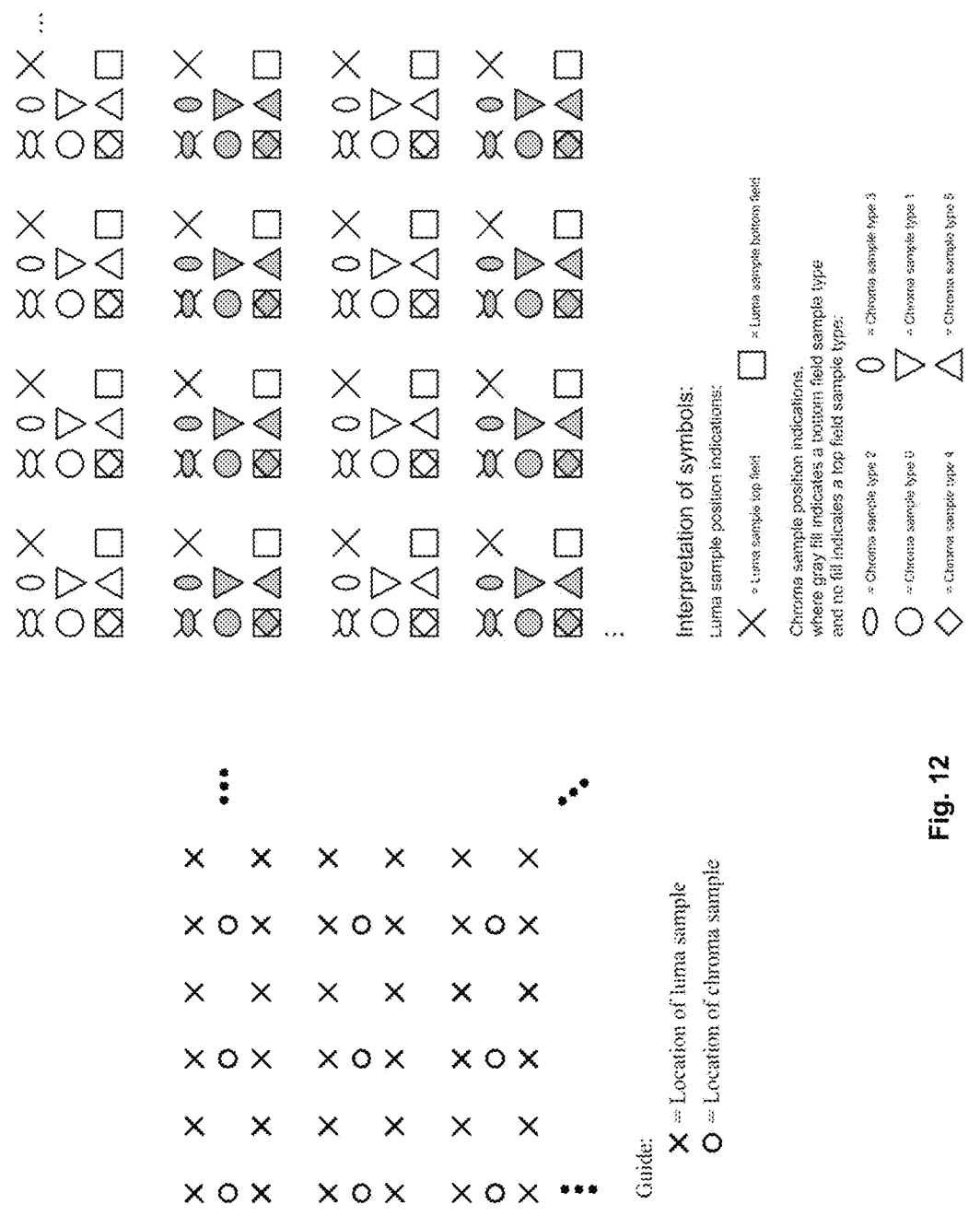

FIG. 12 illustrates Chroma component location in case of 4:2:0 sampling scheme. Of course, the same may apply to other sampling schemes.

It is known that, when considering the sampling of the Luma and Chroma components in the 4:2:0 sampling scheme, there may be a shift between the Luma and Chroma component grids. In a block of 2×2 pixels (as previously illustrated on FIG. 8), the Chroma components are actually shifted by half a pixel vertically compared to the Luma component (illustrated on the left side of FIG. 12 too). Such shift may have an influence on the interpolation filters when down-sampling from 4:4:4, or when up-sampling. This is why particular embodiments of the invention provide that the weights applied to the colour component values may depend on the sampling pattern used (i.e. depend on the shift resulting from using a particular pattern).

On the right side of FIG. 12, various sampling patterns are represented, in case of interlaced image. This means that also the parity, i.e. whether the pixels are on the top or bottom fields of an interlaced image, is taken into account.

From the schematic illustration of 16 blocks of 2×2 pixels, one may note that six types of Chroma subsampling are proposed, each resulting in a respective position of the two Chroma components relative to the four Luma components within the 2×2 block. In addition, depending on the parity, such six positions are different from one line of 2×2 block to the other (grey fill Chroma samples are differently shifted from Luma components compared to no fill Chrome samples).

Although FIG. 12 is schematic, one may also observe that Chroma components of type 4 (rhombus) is positioned very close to Luma of pixel 2, while in the conventional subsampling scheme it is associated with pixel 0. A mere consequence is that the Chroma components ultimately generated for pixel 2 in the pre-encode block should be substantially taken into account, compared to those Chroma components generated for pixels 1 and 3.

The various patterns have a number of consequences on embodiments of the invention.

Firstly, knowledge of the exact location of the Chroma components may lead to selecting values other than $U'_0/V'_0$ for the decoded output in FIG. 8. For instance, based on Chroma component location of the sampling pattern used, which is indicated in e.g. the VUI syntax element of the SPS, the decoding process can be altered to select e.g. $U'_2/V'_2$ or to make an interpolation between $U'_0/V'_0$ and $U'_2/V'_2$. More generally, the output Chroma values (currently $U'_0/V'_0$) should be parameterized, e.g. as a weighted average of the decoded Chroma values $U'_{0-4}/V'_{0-4}$, the weights depending on the actual Chroma component position for the block (which is usually the pattern represented by the Chroma sample type). Basically, this can be linked to the sampling pattern used for the Chroma components.

As a consequence and secondly, the encoder can select equivalently the different weights depending on said Chroma component location.

Thirdly, for the nominal Chroma component location illustrated in the left part of FIG. 12, the weight of the Chroma components for pixel 2 may differ from the weights assigned to Chroma components of pixel 0 and of pixels 1 and 3.

For instance; a weight $w_{U,V}$ equal to $2^7$ could be assigned to pixel 0, $2^5$ to pixel 2 and 1 to pixels 1 and 3 (similarly $w'_{U,V}=1$ for pixel 0, $2^{-5}$ for pixel 2 and $2^{-7}$ for pixels 1 and 3). Also, the parity of the line can be used to further refine the weights as the position of the Chroma component of same type slightly differs depending on the parity. For instance, for Chroma sample type 0 and interlaced content, the positions whose discus is filled with gray have a ¾ offset and those whose discus is not filled have ¼ offset, instead of the more traditional ½ when the content is progressive.

Note that when the palette mode is activated with no modification of the location of the discarded 4:4:4 Chroma components, it is more efficient to use a Chroma component location with no shift (i.e. indicated as Chroma sample type 2 in the Figure) which differs from the nominal (and more usual) type 0. Indeed, this matches better with the current decoding process.

Figure 13:
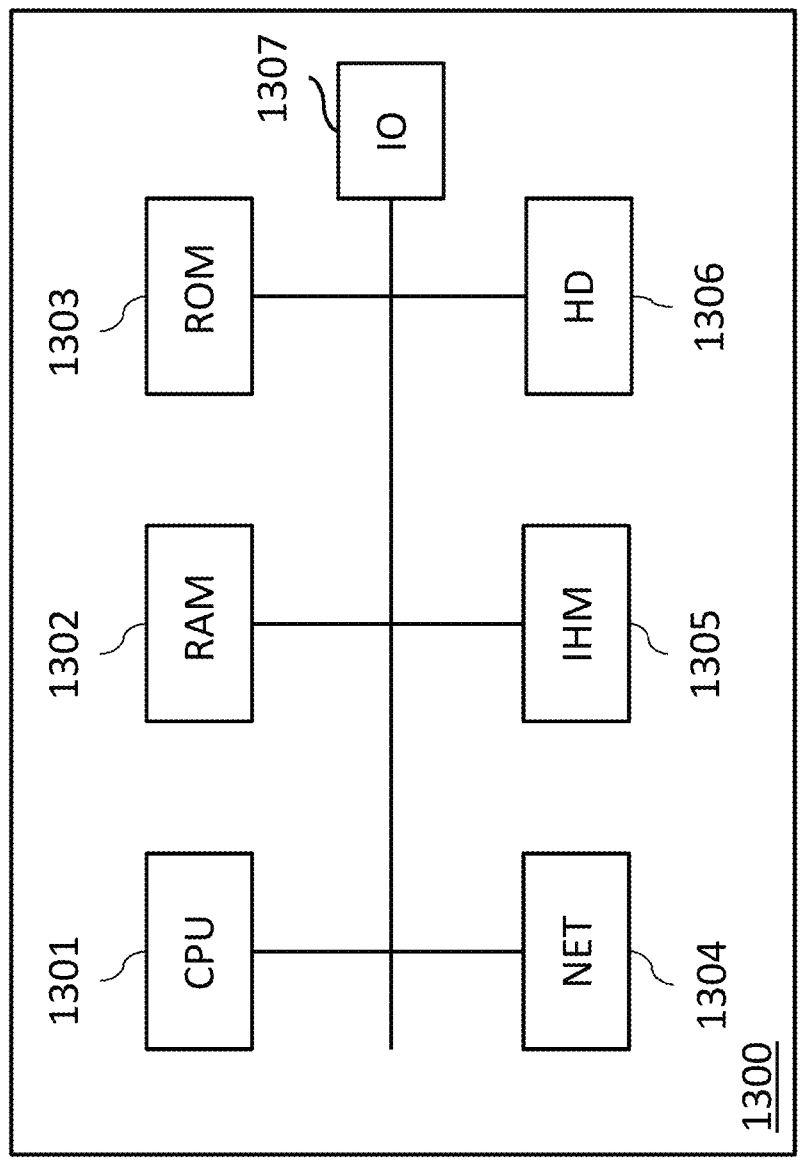
FIG. 13 is a schematic block diagram of a computing device for implementation of one or more embodiments of the invention.

FIG. 13 is a schematic block diagram of a computing device 1300 for implementation of one or more embodiments of the invention. The computing device 1300 may be a device such as a micro-computer, a workstation or a light portable device. The computing device 1300 comprises a communication bus connected to:

- a central processing unit 1301, such as a microprocessor, denoted CPU;
- a random access memory 1302, denoted RAM, for storing the executable code of the method of embodiments of the invention as well as the registers adapted to record variables and parameters necessary for implementing the method for encoding a block of pixels in an image according to embodiments of the invention, the memory capacity thereof can be expanded by an optional RAM connected to an expansion port for example;
- a read only memory 1303, denoted ROM, for storing computer programs for implementing embodiments of the invention;
- a network interface 1304 is typically connected to a communication network over which digital data to be processed are transmitted or received. The network interface 1304 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 1301;
- a user interface 1305 may be used for receiving inputs from a user or to display information to a user;
- a hard disk 1306 denoted HD may be provided as a mass storage device;
- an I/O module 1307 may be used for receiving/sending data from/to external devices such as a video source or display.

The executable code may be stored either in read only memory 1303, on the hard disk 136 or on a removable digital medium such as for example a disk. According to a variant, the executable code of the programs can be received by means of a communication network, via the network interface 1304, in order to be stored in one of the storage means of the communication device 1300, such as the hard disk 1306, before being executed.

The central processing unit 1301 is adapted to control and direct the execution of the instructions or portions of software code of the program or programs according to embodiments of the invention, which instructions are stored in one of the aforementioned storage means. After powering on, the CPU 1301 is capable of executing instructions from main RAM memory 1202 relating to a software application after those instructions have been loaded from the program ROM 1203 or the hard-disk (HD) 1306 for example. Such a software application, when executed by the CPU 1301, causes the steps of the flowcharts shown in FIG. 9, 10 or 11 to be performed.

Any step of the algorithms shown in FIG. 9, 10 or 11 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encoding a block of pixels in an image, the method comprising the following steps:
   obtaining an input block of input pixels conforming to an input sampling scheme having subsampling of at least one of colour components forming the pixels;
   up-sampling the input block into a pre-encode block of pre-encode pixels conforming to a pre-encode sampling scheme having no subsampling of the colour components;
   encoding the pre-encode block of pre-encode pixels, wherein encoding the pre-encode block includes assigning weights to the values of the at least one subsampled colour component of pre-encode pixels depending on whether the corresponding values of the same subsampled colour component exist or not in the corresponding input pixels due to the subsampling, and includes evaluating a measure using the weighted values of the pre-encode pixels,
   wherein a first weight assigned to the value of a subsampled colour component of a first pre-encode pixel which corresponds to an input pixel having a value for the same subsampled colour component is higher than a second weight applied to the value of the same subsampled colour component of a second pre-encode pixel which corresponds to an input pixel having no value for the same subsampled colour component.

2. The method of claim 1, wherein encoding the pre-encode block applies a palette coding mode on the pre-encode block, the palette coding mode using a palette comprising a set of entries associating respective entry indexes with corresponding sets of pixel colour component values.

3. The method of claim 1, wherein the ratio between the first and second weights is a power of 2, $2^5$ or $2^7$.

4. The method of claim 1, wherein the input sampling scheme subsamples at least one Chroma component of the pixels, for instance a YUV 4:2:0 scheme.

5. The method of claim 1, wherein the same weight is assigned to two Chroma component values of a pre-encode pixel.

6. The method of claim 1, wherein a weight equal to 1 is assigned to all Luma colour components of the pre-encode pixels.

7. The method of claim 1, wherein the weight assigned to a value of a subsampled colour component of a pre-encode pixel is a non-zero weight when the corresponding input pixel does not have a value for the same subsampled colour component.

8. The method of claim 2, wherein evaluating a measure includes calculating updated pixel colour component values for a palette entry when building the palette, based on the weighted values of pre-encode pixels associated with said palette entry.

9. The method of claim 8, wherein the updated pixel colour component values are weighted average values of the values of the colour components of the pre-encode pixels associated with said palette entry.

10. The method of claim 2, wherein encoding the pre-encode block of pre-encode pixels includes determining a palette entry for each pre-encode pixel by evaluating a distortion measure between the pre-encode pixel and at least one palette entry using weighted values of colour components of the pre-encode pixel.

11. The method of claim 10, wherein the same weight is assigned to the values of two colour components of a pre-encode pixel which corresponds to an input pixel having values for the same two colour components.

12. The method of claim 2, wherein encoding the pre-encode block of pre-encode pixels includes evaluating the opportunity to replace a palette entry by a palette entry predictor by evaluating a distortion measure between at least one pre-encode pixel associated with the palette entry and at least one palette entry predictor using weighted values of colour components of the pre-encode pixel.

13. The method of claim 1, wherein the colour components of the pixels are organised and spatially positioned according to a predetermined colour component pattern, and the weights applied to the colour component values depend on the predetermined colour component pattern used.

14. A non-transitory computer-readable medium storing a program which, when executed by a microprocessor or computer system in a device, causes the device to perform the method of claim 1.

15. A device for encoding a block of pixels in an image, the device comprising at least one microprocessor configured for carrying out, in a web runtime environment running in the device, the steps of:
   obtaining an input block of input pixels conforming to an input sampling scheme having subsampling of at least one of colour components forming the pixels;
   up-sampling the input block into a pre-encode block of pre-encode pixels conforming to a pre-encode sampling scheme having no subsampling of the colour components;
   encoding the pre-encode block of pre-encode pixels, wherein encoding the pre-encode block includes assigning weights to the values of the at least one subsampled colour component of pre-encode pixels depending on whether the corresponding values of the same subsampled colour component exist or not in the corresponding input pixels due to the subsampling, and includes evaluating a measure using the weighted values of the pre-encode pixels,
   wherein a first weight assigned to the value of a subsampled colour component of a first pre-encode pixel which corresponds to an input pixel having a value for the same subsampled colour component is higher than a second weight applied to the value of the same subsampled colour component of a second pre-encode pixel which corresponds to an input pixel having no value for the same subsampled colour component.

* * * * *